United States Patent
Chen et al.

(10) Patent No.: US 10,318,884 B2
(45) Date of Patent: Jun. 11, 2019

(54) VENUE LINK DETECTION FOR SOCIAL MEDIA MESSAGES

(71) Applicant: FUJI XEROX CO., LTD., Tokyo (JP)

(72) Inventors: Francine Chen, Menlo Park, CA (US); Bokai Cao, Chicago, IL (US); Yin-Ying Chen, Sunnyvale, CA (US); Dhiraj Joshi, Fremont, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 802 days.

(21) Appl. No.: 14/835,624

(22) Filed: Aug. 25, 2015

(65) Prior Publication Data
US 2017/0061308 A1  Mar. 2, 2017

(51) Int. Cl.
G06N 20/00 (2019.01)
H04L 12/58 (2006.01)
G06N 99/00 (2019.01)

(52) U.S. Cl.
CPC .......... *G06N 20/00* (2019.01); *G06N 99/005* (2013.01); *H04L 51/20* (2013.01); *H04L 51/32* (2013.01)

(58) Field of Classification Search
CPC ............................... H04L 51/32; G06N 99/005
See application file for complete search history.

(56) References Cited

U.S. PATENT DOCUMENTS

| | | | |
|---|---|---|---|
| 8,200,247 B1 * | 6/2012 | Starenky | G01C 21/28 455/456.3 |
| 8,990,327 B2 * | 3/2015 | Drews | G06F 17/30 707/778 |
| 2009/0092322 A1 | 4/2009 | Erol et al. | |
| 2011/0040837 A1 * | 2/2011 | Eden | G06F 17/3071 709/206 |

(Continued)

OTHER PUBLICATIONS

Li, R., Wang, S., Deng, H., Wang, R., & Chang, K. C. C. (Aug. 2012). Towards social user profiling: unified and discriminative influence model for inferring home locations. In Proceedings of the 18th ACM SIGKDD international conference on Knowledge discovery and data mining (pp. 1023-1031). ACM. (Year: 2012).*

(Continued)

*Primary Examiner* — Scott A. Waldron
*Assistant Examiner* — Oluwatosin O Alabi
(74) *Attorney, Agent, or Firm* — Morgan, Lewis & Bockius LLP

(57) ABSTRACT

A method associates social media messages with venues. A social network graph includes users, messages from users, and venues. The venues include multiple primary venues and a no-venue. A link between a message and the no-venue node indicates that the message is not associated with a primary venue. Training feature vectors are constructed that measure connectedness between messages and venues. The process trains a classifier to estimate probabilities that messages are associated with venues. A new social media message is received, and the process constructs a feature (Continued)

vector using the same features as the training vectors, measuring connectedness between the new message and the no-venue. The classifier computes a probability that the new message is associated with the no-venue. When the probability exceeds a predefined threshold, the new message is not associated with any of the primary venues. Otherwise, the new message is associated with one of the primary venues.

20 Claims, 19 Drawing Sheets

(56) References Cited

U.S. PATENT DOCUMENTS

| | | | | |
|---|---|---|---|---|
| 2011/0238762 | A1* | 9/2011 | Soni | G01C 21/3679 709/206 |
| 2012/0033655 | A1 | 2/2012 | Tang | |
| 2012/0150819 | A1* | 6/2012 | Lindahl | G06F 17/30536 707/687 |
| 2012/0281911 | A1* | 11/2012 | Fung | G06K 9/00677 382/165 |
| 2013/0041653 | A1* | 2/2013 | Tseng | G06Q 50/01 704/9 |
| 2015/0046452 | A1* | 2/2015 | Agrawal | G06F 17/30241 707/737 |
| 2017/0109615 | A1 | 4/2017 | Yatziv et al. | |

OTHER PUBLICATIONS

Sun, Y., Han, J., Yan, X., Yu, P. S., & Wu, T. (2011). Pathsim: Meta path-based top-k similarity search in heterogeneous information networks. Proceedings of the VLDB Endowment, 4(11), 992-1003. (Year: 2011).*
Rout, D., Bontcheva, K., Preotiuc-Pietro, D., & Cohn, T. (May 2013). Where's@ wally?: a classification approach to geolocating users based on their social ties. In Proceedings of the 24th ACM Conference on Hypertext and Social Media (pp. 11-20). ACM (Year: 2013).*
Rao, A., Ratnasamy, S., Papadimitriou, C., Shenker, S., & Stoica, I. (Sep. 2003). Geographic routing without location information. In Proceedings of the 9th annual international conference on Mobile computing and networking (pp. 96-108). ACM. (Year: 2003).*
De Couto, D. S., & Morris, R. (2001). Location proxies and intermediate node forwarding for practical geographic forwarding (Year: 2001).*
Adam Sadilek, Henry Kautz, and Jeffrey P Bigham. Finding your friends and following them to where you are. In WSDM, pp. 723 732. ACM, 2012, (10 pgs.).
Adam Sadilek, Henry A Kautz, and Vincent Silenzio. Predicting disease transmission from geo-tagged micro-blog data. In AAAI, Proceedings of the Twenty Sixth Conference on Artificial Intelligence, 2012, (7 pgs.).
Benjamin P Wing and Jason Baldridge. Simple supervised document geolocation with geodesic grids. In ACL, pp. 955-964. Association for Computational Linguistics, 2011, (10 pgs.).
Bo Han, Paul Cook, and Timothy Baldwin. Text-based Twitter user geolocation prediction, Journal of Artificial Intelligence Research, 49:451 500, 2014, (50 pgs.).
Bokai Cao, Xiangnan Kong, and Philip S Yu. Collective prediction of multiple types of links in heterogeneous information networks. In ICDM. IEEE, 2014, (10 pgs.).
Brent Hecht, Lichan Hong, Bongwon Suh, and Ed H Chi. Tweets from Justin Bieber's heart: the dynamics of the location field in user profiles. In CHI, pp. 237 246. ACM, 2011, (10 pgs.).
Chenliang Li and Aixin Sun. Fine-grained location extraction from tweets with temporal awareness. In SIGIR, pp. 43-52. ACM, 2014, (24 pgs).

Clodoveu A Davis Jr, Gisele L Pappa, Diogo Renno Rocha de Oliveira, and Filipe de L Arcanjo. Inferring the location of Twitter messages based on user relationships. Transactions in GIS, 15(6):735 751, 2011, (26 pgs.).
Dmytro Karamshuk, Anastasios Noulas, Salvatore Scellato, Vincenzo Nicosia, and Cecilia Mascolo. Ceo-spotting: mining online location-based services for optimal retail store placement. In KDD, pp. 793-801. ACM, 2013, (22 pgs.).
Eunjoon Cho, Seth A Myers, and Jure Leskovec. Friendship and mobility: user movement in location-based social networks. In KDD, pp. 1082 1090, ACM, 2011, (9 pgs.).
Francine Chen, Dhiraj Joshi, Yasuhide Miura, and Tomoko Ohkuma. Social media-based profiling of business locations. In GeoMM. ACM, 2014, (6 pgs.).
Jacob Eisenstein, Brendan O'Connor, Noah A Smith, and Eric P Xing. A latent variable model for geographic lexical variation. In EMNLP, pp. 1277 1287. ACL, 2010, (11 pgs.).
Jalal Mahmud, Jeffrey Nichols, and Clemens Drews. Where is this tweet from? Inferring home locations of Twitter users. In ICWSM, 2012, (4 pgs.).
Jiawei Zhang, Xiangnan Kong, and Philip S Yu. Transferring heterogeneous links across location-based social networks. In WSDM, pp. 303 312. ACM, 2014, (10 pgs.).
Lars Backstrom, Eric Sun, and Cameron Marlow. Find me if you can: improving geographical prediction with social and spatial proximity. In WWW, pp. 61-70, ACM, 2010, (10 pgs.).
Liangjie Hong, Amr Ahmed, Siva Gurumurthy, Alexander J Smola, and Kostas Tsioutsiouliklis. Discovering geographical topics in the Twitter stream. In WWW, pp. 769-778. ACM, 2012, (10 pgs.).
Miller McPherson, Lynn Smith-Lovin, and James M Cook. Birds of a feather: Homophily in social networks. Annual review of sociology, pp. 415-444, 2001, (31 pgs.).
Nan Lin. Social networks and status attainment. Annual review of sociology, pp. 467-487, 1999, (21 pgs.).
Sheila Kinsella, Vanessa Murdock, and Neil O'Hare. I'm eating a sandwich in Glasgow: modeling locations with tweets. In SMUG, pp. 61 68. ACM, 2011, (8 pgs.).
Takeshi Sakaki, Makoto Okazaki, and Yutaka Matsuo. Earthquake shakes Twitter users: real-time event detection by social sensors. In WWW, pp. 851 860. ACM, 2010, (10 pgs.).
Wen Li, Pavel Serdyukov, Arjen P de Vries, Carsten Eickhoff, and Martha Larson. The where in the tweet. In CIKM, pp. 2473-2476. ACM, 2011, (4 pgs.).
Xiangnan Kong, Bokai Cao, and Philip S Yu. Multi-label classification by mining label and instance correlations from heterogeneous information networks. In KDD, pp. 614 622. ACM, 2013, (9 pgs.).
Xia Wang, Ming Xu, Yizhi Ren, Jian Xu, Haiping Zhang, and Ning Zheng. A location inferring model based on tweets and bilateral follow friends. Journal of Computers, 9(2):315 321, 2014, (8 pgs.).
Yizhou Sun, Brandon Norick, Jiawei Han, Xifeng Yan, Philip S Yu, and Xiao Yu. Integrating meta-path selection with user-guided object clustering in heterogeneous information networks. In KDD, pp. 1348-1356. ACM, 2012, (9 pgs.).
Yizhou Sun, Jiawei Han, Xifeng Yan, Philip S Yu, and Tianyi Wu. Pathsim: Meta path-based top-k similarity search in heterogeneous information networks. In VLDB, 2011, (12 pgs.).
Yohei Ikawa, Miki Enoki, and Michiaki Tatsubori. Location inference using microblog messages. In WWW {Companion), pp. 687690. ACM, 2012, (14 pgs.).
Zhiyuan Cheng, James Caverlee, and Kyumin Lee. You are where you tweet: a content-based approach to geo-locating Twitter users. In CIKM, pp. 759-768, ACM, 2010, (10 pgs.).
Zhang, Meta-path based Multi-Network Collective Link Prediction, Aug. 24-27, 2014, 10 pgs.
Rakesh, Location-Specific Tweet Detection and Topic Summarization in Twitter, 2013 IEEE/ACM International Conf. on Advances in Social Networks Analysis and Mining, Aug. 25-28, 2013, 4 pgs.
Liben-Nowell, The Link-Prediction Problem for Social Networks, Wiley InterScience Discover Something Great, Dept. of Computer Science, Carleton College, Aug. 25, 2006, 13 pgs.
Al Hasan, Dept. of Computer and Information Science Indiana Univ., A Survey of Link Prediction in Social Networks, 2011, 33 pgs.

(56) References Cited

OTHER PUBLICATIONS

Flatow, On the Accuracy of Hyper-Local Geotagging of Social Media Content, Feb. 2-6, 2015, 10 pgs.
Li, Fine-Grained Location Extraction from Tweets with Temporal Awareness, Jul. 6-11, 2014, 10 pgs.

* cited by examiner

| Types | Meta-paths |
|---|---|
| EGOPATH 602 | tweet $\xrightarrow{write^{-1}}$ Twitter user $\xrightarrow{checkin}$ venue |
| | tweet $\xrightarrow{write^{-1}}$ Twitter user $\xrightarrow{anchor}$ Foursquare user $\xrightarrow{mayor}$ venue |
| | tweet $\xrightarrow{write^{-1}}$ Twitter user $\xrightarrow{anchor}$ Foursquare user $\xrightarrow{write}$ tip $\xrightarrow{locate}$ venue |
| FRIENDPATH 604 | tweet $\xrightarrow{write^{-1}}$ Twitter user $\xrightarrow{friend}$ Twitter user $\xrightarrow{checkin}$ venue |
| | tweet $\xrightarrow{write^{-1}}$ Twitter user $\xrightarrow{friend}$ Twitter user $\xrightarrow{anchor}$ Foursquare user $\xrightarrow{mayor}$ venue |
| | tweet $\xrightarrow{write^{-1}}$ Twitter user $\xrightarrow{friend}$ Foursquare user $\xrightarrow{write}$ tip $\xrightarrow{locate}$ venue |
| | tweet $\xrightarrow{write^{-1}}$ Twitter user $\xrightarrow{anchor}$ Foursquare user $\xrightarrow{friend}$ Foursquare user $\xrightarrow{write}$ tip $\xrightarrow{locate}$ venue |
| INTERESTPATH 606 | tweet $\xrightarrow{write^{-1}}$ Twitter user $\xrightarrow{checkin}$ venue $\xrightarrow{belong}$ category $\xrightarrow{belong^{-1}}$ venue |
| | tweet $\xrightarrow{write^{-1}}$ Twitter user $\xrightarrow{anchor}$ Foursquare user $\xrightarrow{mayor}$ venue $\xrightarrow{belong}$ category $\xrightarrow{belong^{-1}}$ venue |
| | tweet $\xrightarrow{write^{-1}}$ Twitter user $\xrightarrow{anchor}$ Foursquare user $\xrightarrow{write}$ tip $\xrightarrow{locate}$ venue $\xrightarrow{belong}$ category |
| TEXTPATH 608 | tweet $\xrightarrow{contain}$ word $\xrightarrow{contain^{-1}}$ tip $\xrightarrow{locate}$ venue |

Figure 6A $$\mathrm{EGOGEO}(t_i, v_p) = -\log \left( \min_{t_j \in T_i - t_i} \|t_j - v_p\|_1 + \epsilon \right)$$

Figure 6B

$$\mathrm{FRIENDGEO}(t_i, v_p) = -\log \left( \min_{t_j \in T_k, u_k \in N_i} \|t_j - v_p\|_1 + \epsilon \right)$$

Figure 6C

| Label 720 | Message Identifier 722 | Venue Identifier 724 | Ego Path Count 702 | Friend Path Count 704 | Interest Path Count 706 | Text Path Count 708 | Ego Geo 710 | Friend Geo 712 | |
|---|---|---|---|---|---|---|---|---|---|
| 1 | tweet 918372 | venue 1038 | [ 5 | 0 | 12 | 3 | 8.72326584 | 8.72692089] | ← Feature Vector 226-1 |
| 1 | tweet 66589 | venue 5387 | [ 0 | 2 | 0 | 1 | 5.51803083 | 4.11826654] | ← Feature Vector 226-2 |
| ... | ... | ... | | | | | | | |
| 1 | tweet 102928 | venue 992 | [ 1 | 0 | 3 | 1 | 7.43745361 | 4.65029298] | ← Feature Vector 226-3 |
| 0 | tweet 772987 | venue 291 | [ 0 | 0 | 0 | 0 | 0.27895894 | 4.09643538] | ← Feature Vector 226-4 |
| 0 | tweet 58294 | venue 3219 | [ 0 | 0 | 0 | 1 | 2.07541817 | 4.93630349] | ← Feature Vector 226-5 |
| ... | ... | ... | | | | | | | |
| 0 | tweet 19883 | venue 10946 | [ 0 | 0 | 1 | 2 | 8.45201711 | 7.31271901] | ← Feature Vector 226-6 |

Figure 7

Method A: $score = \dfrac{Pr(link(t_i,v_0)|f_{i0})-M}{M}$

Figure 10A

Method B: $score = \dfrac{Pr(link(t_i,v_0)|f_{i0})-M}{\Sigma_j Pr\left(link(t_i,v_j)|f_{ij}\right)}$

Figure 10B

|  | With geo features | No geo features | No geo features | No-venue node only |
|---|---|---|---|---|
| sample size | 100 | 100 | 10000 | 10000 |
| % linked | 17.0 | 17.0 | 24.1 | 24.1 |
| accuracy | 0.915 | 0.930 | 0.905 | 0.91 |
| precision | 1.000 | 1.000 | 1.000 | 1.00 |
| recall | 0.502 | 0.588 | 0.609 | 0.61 |
| F1 | 0.668 | 0.741 | 0.757 | 0.76 |

VENUE LINK DETECTION FOR SOCIAL MEDIA MESSAGES

RELATED APPLICATIONS

This application is related to U.S. patent application Ser. No. 14/664,734, filed Mar. 20, 2015, entitled "Methods and Systems of Venue Inference for Social Messages," which is incorporated herein by reference in its entirety.

TECHNICAL FIELD

The present application generally related to venue detection and more specifically to identification of venues based on social media messages.

BACKGROUND

Social platforms (e.g., Twitter) are popular for sharing activities, thoughts, and opinions. Geotagging of social media messages (e.g., associating a physical location or venue with a tweet) enables applications to personalize a user's experience based on location information. However, due to privacy concerns, only a small percentage of users choose to publicize their location when they post social media messages, and others reveal the locations of their messages only occasionally.

Because only a small proportion of social media messages are explicitly geotagged to a location, inferring locations of social media messages based on other information (e.g., content of the messages) can be useful. For example, according to one study, less than 1% of tweets are geotagged. For non-geotagged messages, some applications infer location based on the textual content of messages. However, messages can mix a variety of daily activities (e.g., food, sports, emotions, opinions) without clear location signals. In addition, many social media messages (e.g., tweets) are short and informal, so clear geographic terms may not appear in the content at all. Even if proper place names are included, it can still be difficult to identify a specific location, especially for chain stores. For example, there may not be a significant difference between the content of tweets that are associated with a Starbucks site in Berkeley versus at a Starbucks site at Stanford. Therefore, it is not easy to tell from the content of a tweet which branch store the tweet was posted from.

Inferring the location of non-geotagged social media messages can facilitate better understanding of a user's geographic context, which can enable better inference of a geographic intent in search queries, more appropriate placement of advertisements, and display of information about events, points of interest, and people in the geographic vicinity of the user. Conventional systems and methods for identifying geographic locations corresponding to social media messages can be roughly categorized into two groups based on the techniques used for geo-locating: (1) content analysis of the social media messages; and (2) inference based on social relations of users. Some systems focus on inferring the locations of the users, whereas other systems focus on inferring the locations associated with individual social media messages.

One problem with location inferences is that not all social media messages are associated with a location or venue. Given a social media message that is not geotagged, some applications compute a probability for each of a plurality of venues, and estimate the correct venue as the one (or ones) with the highest probability. Unfortunately, this technique can incorrectly associate a social media message with a venue when the message should not be linked to any venue at all.

SUMMARY

In the automatic assignment of social media messages to venues, an important first step is to determine whether a non-geotagged message is actually "linked" to at least one venue of interest, where a link indicates that the message was posted at the venue. Then, only messages that are linked to at least one venue of interest are further analyzed. For example, the venue can be predicted or candidate venues can be ranked.

Disclosed implementations provide methods for venue link detection based on social network analysis. The network includes nodes representing venues of interest. The network also includes a special node representing "no-venue." A link detector is trained on messages posted at venues of interest and messages not relevant to any venue. Then the probability of a non-geotagged message being linked to each venue is computed using the trained model, and a statistic of the resulting distribution stored. In some implementations, the statistic is then used to normalize the probability of a message being linked to no-venue node. The statistic is used to determine whether the message is linked to at least one of the venues.

Disclosed implementations are applicable to various social networks to identify whether content generated by a user is linked to any venue. Such networks include various microblogs and mobile social media postings, photos taken by users, and paper-author-publication venue networks.

Systems and methods according to implementations of the present disclosure make use of other social messages (e.g., tweets, Facebook posts, etc.) by a user and social messages posted by other people in the user's social network. In some implementations, the problem is solved by analyzing the social activities embedded in a constructed heterogeneous information network and leveraging available but limited geographic data.

In some implementations, methods are disclosed for identifying the specific venue and location of a non-geotagged social message, which simultaneously indicates the geographic location at a very fine-grained granularity and the venue name that is associated with the social message. In some implementations, social network information is encoded using meta-paths in a social network. Geographic information embedded in the social network is also used. A classifier is trained to compute the probability of whether a social media message and venue (an actual venue or the no-venue node) are linked.

In accordance with some implementations, a process infers linkage between social media messages and venues. The process is performed at a computer system having one or more processors and memory. The memory stores one or more programs that are configured for execution by the one or more processors. The process accesses a social network graph. The social network graph includes nodes representing social media users, nodes representing social media messages generated by the social media users, and nodes representing venues. The venues represented in the social network graph include a plurality of primary venues (i.e., real venues) and a "no-venue" node. A link in the social network graph between a social media message node and a node corresponding to the no-venue indicates that the social media message does not correspond to any of the primary venues.

The process constructs a plurality of training feature vectors. Each training feature vector includes a respective plurality of features that use paths through the social network graph to measure connectedness between a respective social media message and a respective venue. The process uses the training feature vectors to train a classifier to estimate probabilities that social media messages are associated with venues. The process receives a new social media message from a user, and constructs a feature vector for the new social media message. Each feature vector includes a plurality of features that use paths through the social network graph to measure connectedness between the new social media message and the no-venue node. The process then executes the trained classifier using the feature vector as input to compute a probability that the new social media message is associated with the no-venue node. When the computed probability is greater than a predefined threshold value, the process determines that the new social media message is not associated with any of the primary venues. When the computed probability is less than or equal to the predefined threshold value, the process determines that the new social media message is associated with one of the primary venues.

In some implementations, the computed probability is normalized prior to comparing to the predefined threshold value. In some implementations, the process uses the classifier to compute a median probability of a social media message being associated with a venue, and normalizes the computed probability for the new social media message using the median probability.

In some implementations, each training feature vector includes a label that indicates whether or not the respective social media message is associated with the respective venue. In some implementations, some of the features of each training feature vector are measures based on respective types of path through the social network graph. In some implementations, a first feature corresponds to paths through the social network graph directly from a user's social media messages to venues. In some implementations, a second feature corresponds to paths through the social network graph from a user's social media messages to venues through connections with friends. In some implementations, the social network graph includes nodes corresponding to venue categories, and a third feature corresponds to paths through the social network graph that connect pairs of venues sharing a common venue category. In some implementations, the social network graph includes nodes corresponding to content words from social media messages, and a fourth feature corresponds to paths through the social network graph that connect pairs of nodes that have one or more shared content words. In some implementations, constructing the plurality of training feature vectors includes obtaining path counts for each respective type of path through the social network graph connecting the respective social media message to the respective venue and setting the path counts as the features in the training feature vectors.

In some implementations, a fifth feature of each training vector measures physical distance between the respective venue and physical coordinates of previously geotagged social media messages generated by the user.

In some implementations, the classifier is trained using a support vector machine.

In some implementations, the primary venues are selected based on at least one of a predefined region, a type of venue, a venue name, a preference by a user, a history of venue inference, and a distance from geo-coordinates associated with a social media message.

In some instances, the new social media message is geotagged. For example, a GPS module on a smart phone may identify the coordinates of the device when a new social media message is created. In some instances, the new social media message is not geotagged.

In some implementations, after determining that the new social media message is associated with one of the primary venues, the process applies a ranking process to determine a specific first venue of the primary venues as corresponding to the social media message. In some implementations, the ranking process includes computing a probability score for at least a plurality of the primary venues, and identifying at least one of the primary venues with a highest probability score as corresponding to the social media message.

Some implementations apply the same techniques described herein to alternative contexts. More generally, the disclosed techniques can be applied to estimate whether content was created at a point of interest (POI). For example, creating a social network graph of photos, users, and points of interest, the techniques can estimate whether a given photo (that is not geotagged) was generated at a point of interest. Similarly, creating a social network graph of submitted papers, authors, and conferences, the disclosed techniques can estimate whether a paper was generated at a conference.

BRIEF DESCRIPTION OF THE DRAWINGS

FIG. 6A provides examples of meta-paths used in some venue link detection systems in accordance with some implementations.

FIGS. 6B and 6C illustrate formulas used to compute geographic proximity in accordance with some implementations.

FIG. 7 provides some example training feature vectors that are used during a training phase in accordance with some implementations.

FIGS. 10A and 10B illustrate two ways that a venue link classifier can normalize its output to determine whether a social media message is linked to a venue in accordance with some implementations.

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
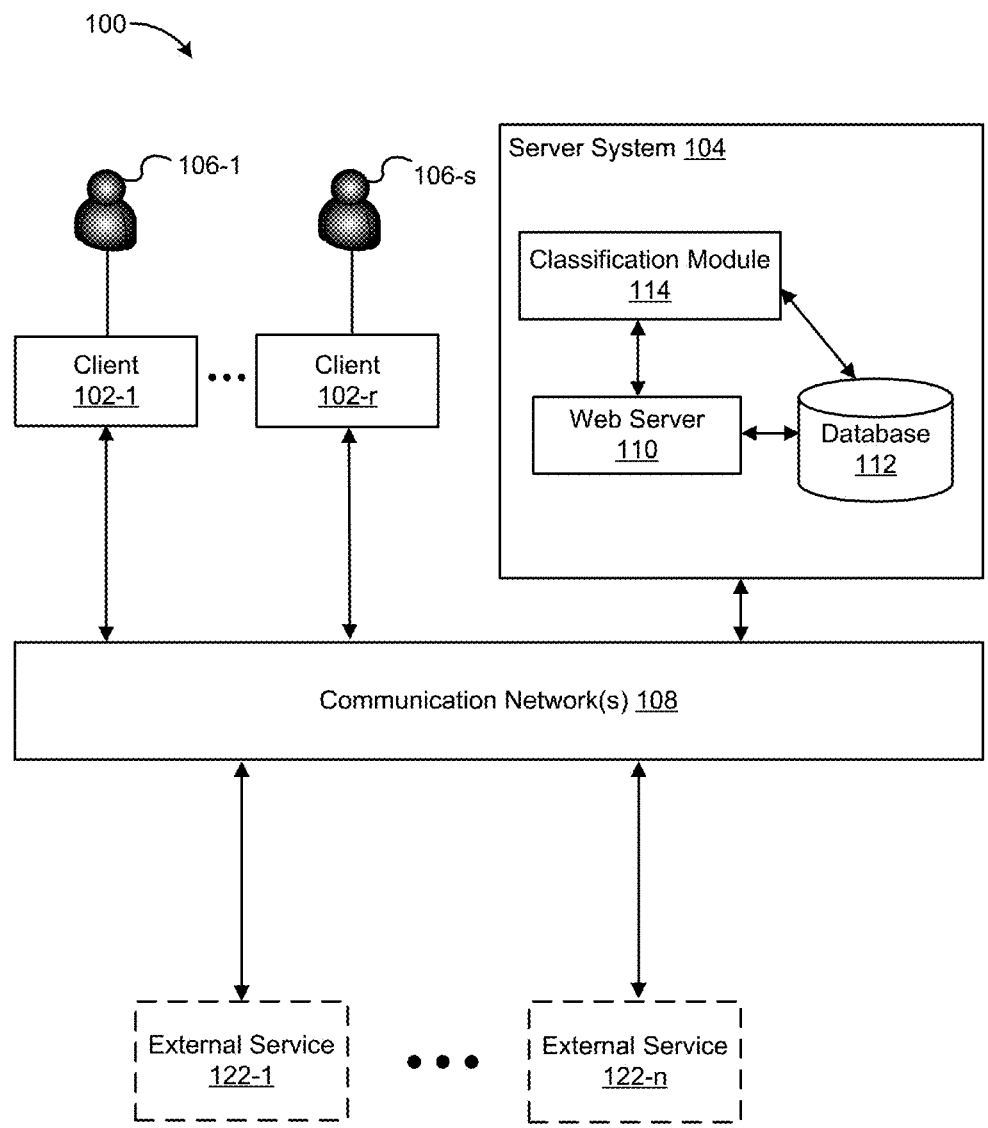
FIG. 1 is a block diagram illustrating a venue link detection system for social media messages in accordance with some implementations.

FIG. 1 is a block diagram of a distributed system 100 including a classification module 114, which is part of a server system 104 according to some implementations. The distributed environment 100 includes one or more clients 102 (e.g., clients 102-1, . . . , 102-s), each operated by a respective user 106 (e.g., users 106-1, . . . , 106-s). There is not necessarily a one-to-one correspondence between the client devices 102 and the users 106. The server system 104 is interconnected with the clients 102 by one or more communication network(s) 108, such as the Internet.

A client 102 (sometimes called a "client device" or a "client computer") may be any computer or similar device through which a user 106 of the client 102 can submit requests to and receive results or services from the server system 104. Examples of client devices include desktop computers, notebook computers, tablet computers, mobile phones, personal digital assistants, set-top boxes, or any combination of the above. A client 102 typically runs client applications 326, which can submit requests to the server system 104. For example, some clients include a web browser 324 or other type of application that permits a user 106 to search for, browse, and/or use resources (e.g., webpages and web services) accessed from the server system 104 over the communication network 108.

In some instances, a client device 102 is a mobile device, such as a laptop computer or a smart phone. Users 106 commonly use mobile devices 102 to execute messaging and social media applications that interact with external services 122, such as Twitter, Foursquare, and Facebook. The server system 104 connects to the external services 122 to obtain the messages as well as venue data for venue estimation.

In some implementations, a client device 102 includes a local classification component (e.g., an application 326), which works in conjunction with the classification module 114 at the server system 104 as components of a social media message classification system. In some implementations, the classification components are software applications for organizing and retrieving social messages from large-scale social media message databases stored at the external services 122 or at the server system 104. In some implementations, the local classification component executes at a client 102, but in other implementations, the local classification component is part of the classification module 114 at the server system 104. In some implementations, the local classification component and the classification module 114 are implemented on separate servers in the server system 104.

The communication network 108 can be any wired or wireless local area network (LAN) and/or wide area network (WAN), such as an intranet, an extranet, the Internet, or a combination of such networks. In some implementations, the communication network 108 uses the HyperText Transport Protocol (HTTP) to transport information using the Transmission Control Protocol/Internet Protocol (TCP/IP). HTTP permits client computers to access various resources available via the communication network 108. The term "resource" as used throughout this specification refers to any piece of information and/or service that is accessible via a content location identifier (e.g., a URL) and can be, for example, a webpage, a document, a database, an image, a computational object, a search engine, or other online information service.

In some implementations, the server system 104 distributes content (e.g., venues, social media messages, web pages, images, digital photos, documents, files, and advertisements). In some implementations, the server system 104 includes many files or other data structures of various types, and those files or data structures include combinations of text, graphics, video, audio, digital photos, and other digital media files.

In some implementations, the server system 104 includes a classification module 114. The classification module 114 is a machine learning application that utilizes a large collection of existing social media messages and venues, such as tweets stored by Twitter, venues stored by Foursquare, to automate classification of social media messages.

In some implementations, the server system 104 connects to the external services 122 and obtains information such as social media messages and venues gathered by the external services 122. The information obtained is then stored in the database 112 on the server 104. In some implementations, the database 112 stores social media messages 228 and venues 230. This data is used to build a social network graph 232. A schema for building such a graph is illustrated below with respect to FIGS. 5 and 11A. In some implementations, during the training of a classifier 224, training feature vectors 226 are stored in the database. In some implementations, the database 112 stores other data as well.

Figure 2:
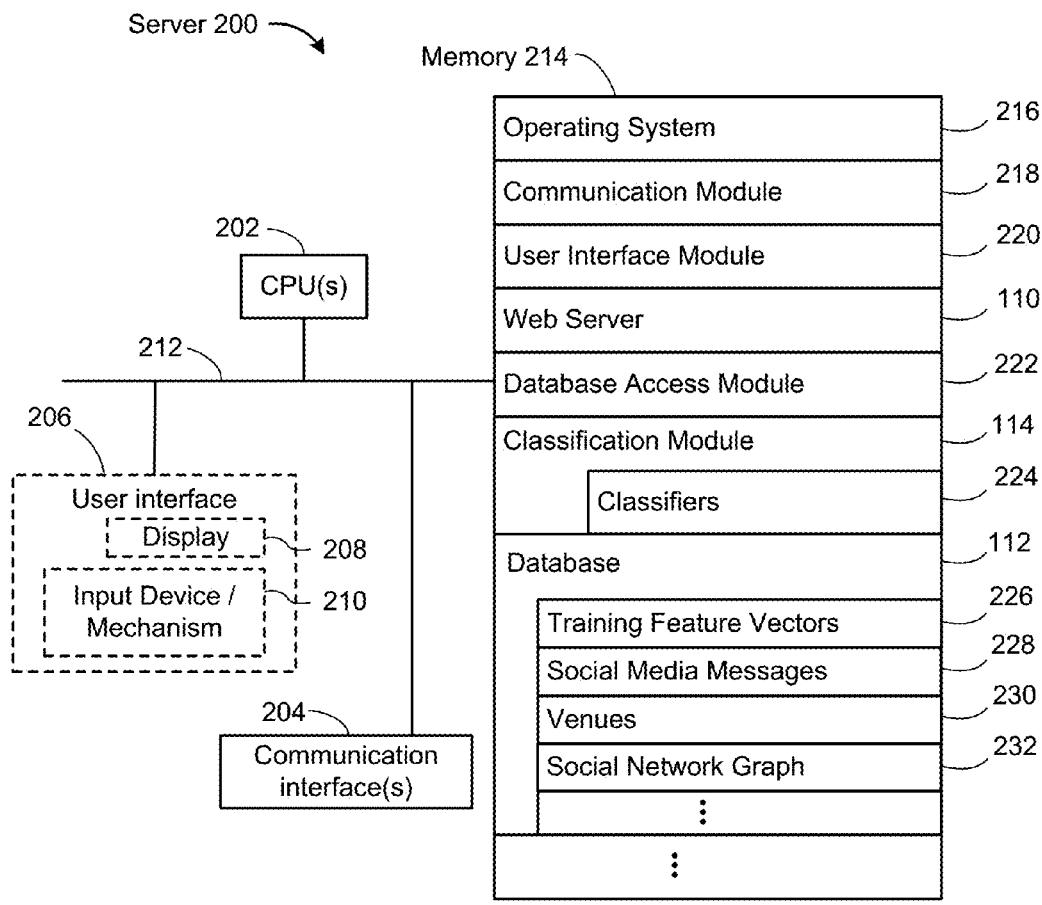
FIG. 2 is a block diagram illustrating a server in accordance with some implementations.

FIG. 2 is a block diagram illustrating a server 200 that may be used in a server system 104. A typical server system includes many individual servers 200, which may be collocated or in multiple distinct physical locations. A server 200 typically includes one or more processing units (CPUs) 202 for executing modules, programs, or instructions stored in the memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. In some implementations, a server 200 includes a user interface 206, which may include a display device 208 and one or more input devices 210, such as a keyboard and a mouse.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communication module 218, which is used for connecting the server 200 to other computers via the one or more communication network interfaces 204 (wired or wireless) and communication networks 108, such as the Internet, other wide area networks, local area networks, metropolitan area networks, and so on;
- a user interface module 220, which receives input from one or more input devices 210, and generates user interface elements for display on a display device 208;
- one or more web servers 110, which receive requests from client devices 102, and return responsive web pages, resources, or links. In some implementations, each request is logged in the database 112;
- a database access module 222, which includes procedures for reading, writing, and querying data stored in the database 112;
- a classification module 114, which is used to train one or more classifiers 224, as described below with respect to FIGS. 4, 7, 8, 9, and 13A-13D; and
- one or more databases 112, which store data used by the classification module 114 or the classifiers 224. In some implementations, the databases 112 are relational databases, such as SQL databases. In some implementations, the databases 112 store training feature vectors 226, as well as other information about the training vectors. In some implementations, the databases 112 store social media messages 228 and venues 230. In some implementations, the databases 112 store additional information about the messages and venues, such as geographic coordinates. In some implementations, the databases store one or more social network graphs 232, which track connections between users 106, messages 228, venues 230, and other relevant entities. FIG. 5 illustrates conceptually a schema 500 for the nodes and links in a social network graph 232 according to some implementations.

Each of the above identified elements in FIG. 2 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 illustrates a server 200, FIG. 2 is intended more as functional illustration of the various features that may be present in servers that are used in a server system 104 rather than as a structural schematic of the implementations described herein. In practice, and as recognized by those of ordinary skill in the art, items shown separately could be combined and some items could be separated. The actual number of servers 200 used to implement these features in a server system 104, and how features are allocated among them, will vary from one implementation to another, and may depend in part on the amount of data traffic that the system must handle during peak usage periods as well as during average usage periods.

Figure 3:
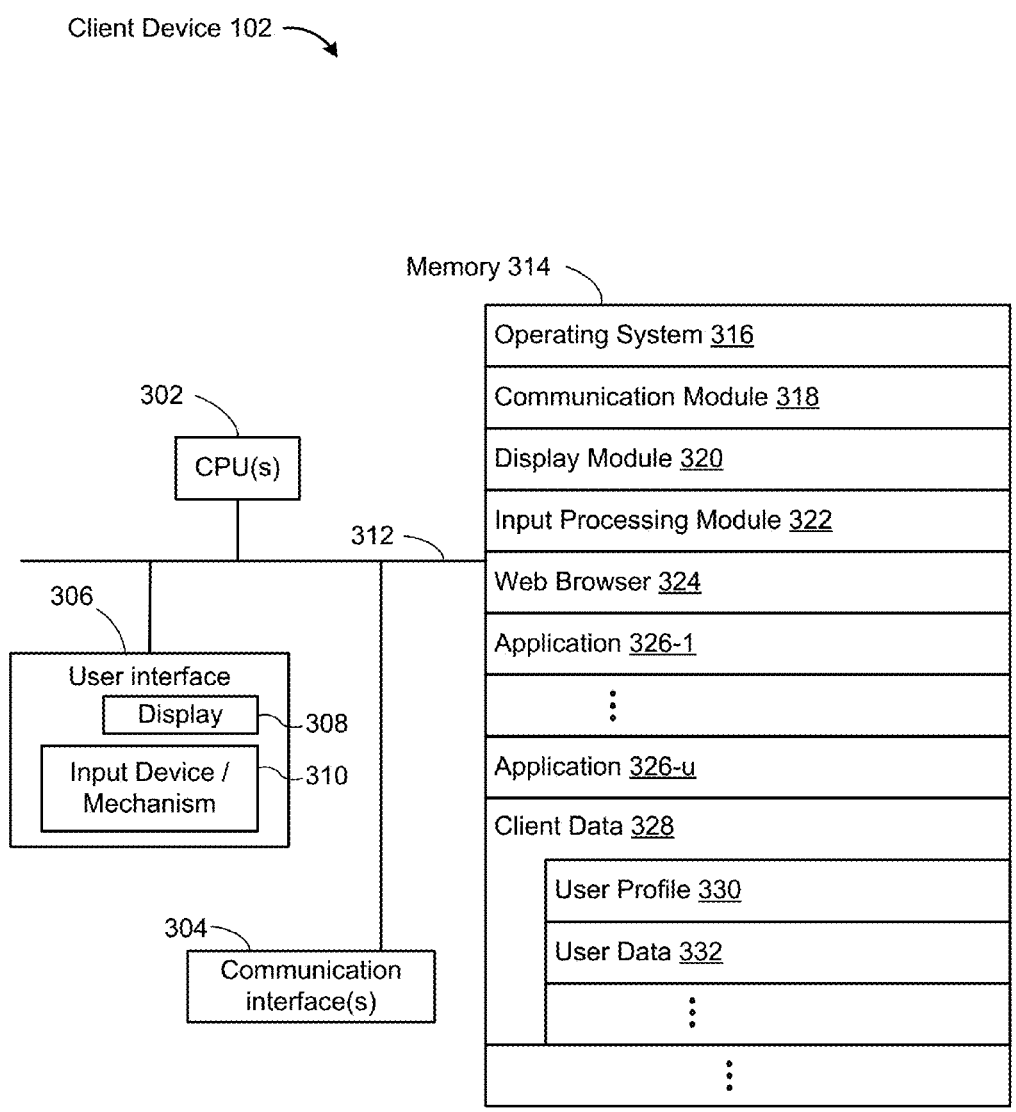
FIG. 3 is a block diagram illustrating a client device in accordance with some implementations.

FIG. 3 is a block diagram illustrating a client device 102 in accordance with some implementations. Client devices 102 include laptop computers, notebook computers, tablet computers, desktops computers, smart phones, and PDAs. A client device 102 typically includes one or more processing units (CPUs) 302, one or more network interfaces 304, memory 314, a user interface 306, and one or more communication buses 312 (sometimes called a chipset) for interconnecting these components. The user interface 306 includes one or more output devices 308 that enable presentation of media content, including one or more speakers and/or one or more visual displays. The user interface 306 also includes one or more input devices 310, including user interface components that facilitate user input such as a keyboard, a mouse, a voice-command input unit or microphone, a touch screen display, a touch-sensitive input pad, a camera (e.g., for scanning an encoded image), a gesture capturing camera, or other input buttons or controls. Furthermore, some client devices 102 use a microphone and voice recognition or a camera and gesture recognition to supplement or replace the keyboard.

The memory 314 includes high-speed random access memory, such as DRAM, SRAM, DDR RAM, or other random access solid state memory devices. In some implementations, the memory includes non-volatile memory, such as one or more magnetic disk storage devices, one or more optical disk storage devices, one or more flash memory devices, or one or more other non-volatile solid state storage devices. In some implementations, the memory 314 includes one or more storage devices remotely located from the processing units 302. The memory 314, or alternatively the non-volatile memory within memory 314 comprises a non-transitory computer readable storage medium. In some implementations, the memory 314, or the non-transitory computer readable storage medium of memory 314, stores the following programs, modules, and data structures, or a subset or superset thereof:

- an operating system 316, which includes procedures for handling various basic system services and for performing hardware dependent tasks;
- a communication module 318, which is used for connecting a client device 102 to other computers and devices via the one or more communication network interfaces 304 (wired or wireless) and one or more communication networks 108, such as the Internet, other wide area networks, local area networks, metropolitan area networks, and so on;
- a display module 320, which receives input from the one or more input devices 310, and generates user interface elements for display on the display device 308;
- an input processing module 322 for detecting one or more user inputs or interactions from one of the one or more input devices 310 and interpreting the detected input or interaction (e.g., processing an encoded image scanned by the camera of the client device);
- a web browser 324, which enables a user to communicate over a network 108 (such as the Internet) with remote computers or devices;
- one or more applications 326-1-326-$u$, which are configured for execution by client device 102. In various implementations, the applications 326 include a camera module, a sensor module, one or more games, application marketplaces, payment platforms, and/or social network platforms. In some implementations, one or more of the applications 326 run within the web browser 324;

client data 328, which includes information about the device 102 or users 106 of the device 102. In some implementations, the client data 328 includes one or more user profiles 330, which may include user accounts, login credentials for each user account, payment data (e.g., linked credit card information, app credit or gift card balance, billing address, shipping address) associated with each user account, custom parameters (e.g., age, location, hobbies) for each user account, and/or social network contacts of each user account. In some implementations, the client data 328 includes user data, which logs user activity on the client device.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 shows a client device 102, FIG. 3 is intended more as a functional description of the various features that may be present rather than as a structural schematic of the implementations described herein. In practice, and as recognized by those of ordinary skill in the art, items shown separately could be combined and some items could be separated.

In some implementations, some of the functions of the server system 104 are performed by a client device 102, and the corresponding sub-modules of these functions may be located within the client device 102 rather than the server system 104. Conversely, in some implementations, some of the functions of a client device 102 are performed by server system 104, and the corresponding sub-modules of these functions may be located within the server system 104 rather than a client device 102. The server 200 and client device 102 shown in FIGS. 2 and 3 illustrate some implementations. Other configurations may be used to implement the functions described herein.

Figure 4:
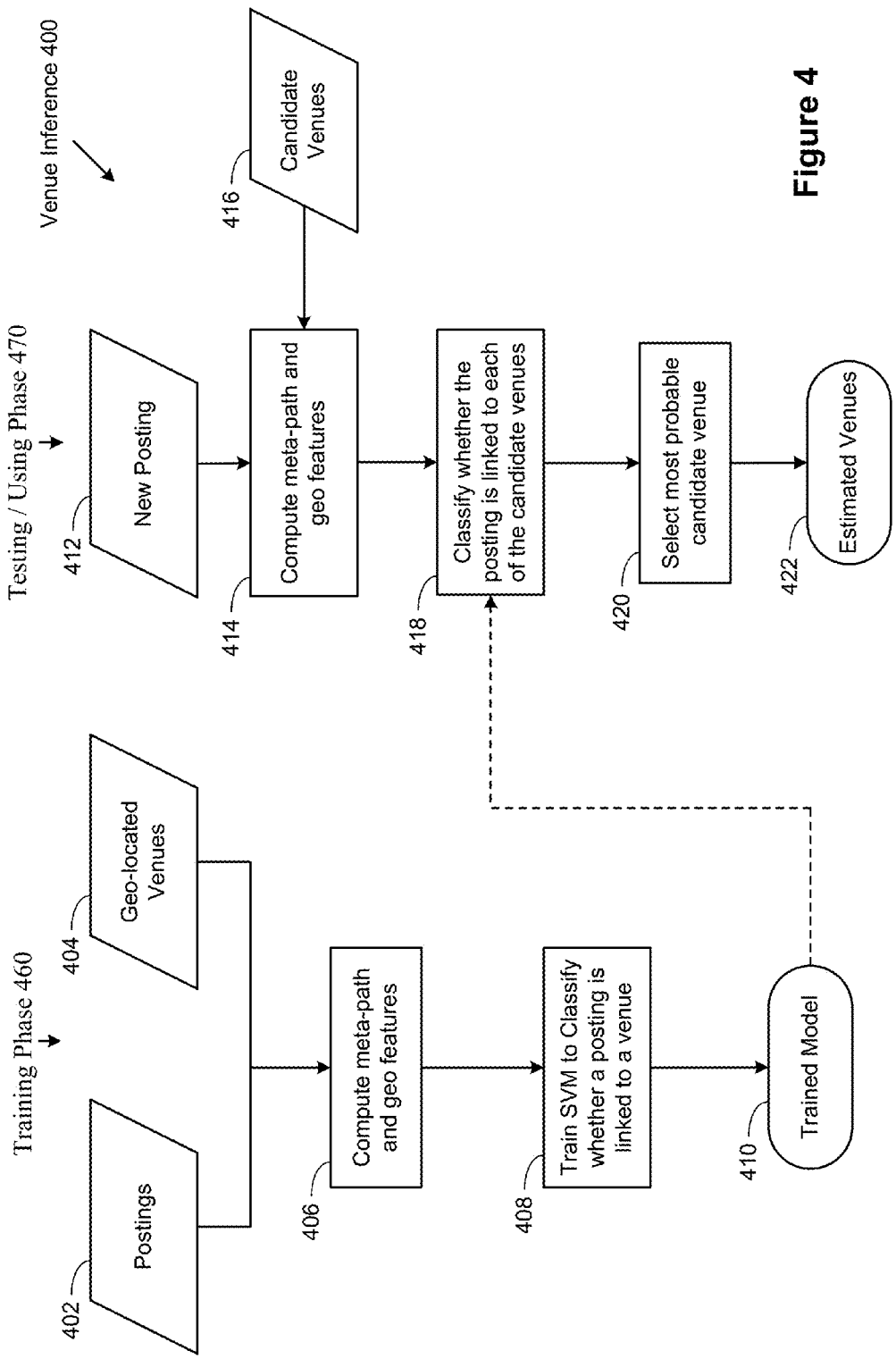
FIG. 4 is a flow chart illustrating a method for inferring venues from social messages in accordance with some implementations.
Figure 5:
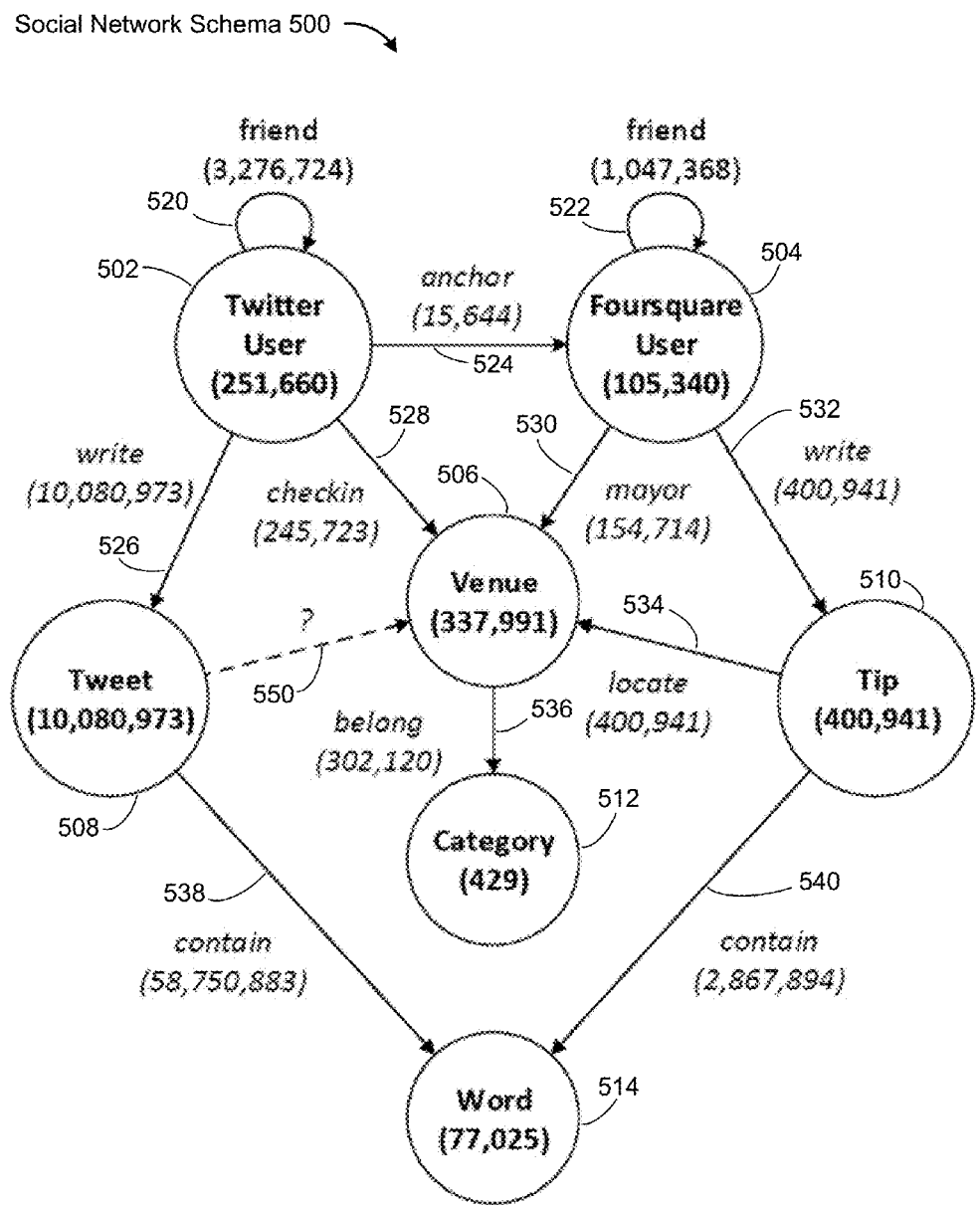
FIG. 5 provides an example of a social network schema used for inferring venues from social messages and detecting venue links in accordance with some implementations.

FIG. 4 is a flowchart of a venue inference method 400 for social media messages 228 in accordance with some implementations. In some implementations, the method 400 is performed by a venue inference system 100. In FIG. 4, the venue inference method 400 has a training phase 460 and testing/using phase 470. In the training phase 460, the server system 104 (e.g., the classification module 114 in the server system) accesses a collection of geo-located venues 404 stored in one or more external services 122 (e.g., Foursquare) and stores them in the venue collection 230 in the database 112. The server system 104 also accesses a collection of postings 402 stored in one or more external services (e.g., Twitter), and stores them in the social media message collection 228. The collection of geo-located venues 404 and the collection of postings 402 are then used by the classification module 114 to train one or more classifiers 224. The one or more trained classifiers can then be used to estimate whether or not a new posting 412 is linked to one of the candidate venues 416 in the testing stage 470. In some implementations, the set of candidate venues 416 and the set of geo-located venues 404 are the same. Typically both of these are subsets of a master venue list 230. In some implementations, one or more filters can be applied to the geo-located venues so that the candidate venues 416 are more likely to be relevant to the new posting. For example, a user posting generating tweets in Boston is probably not at a venue in Los Angeles. In some implementations, the candidate venues are selected based on a predefined region. In some implementations, the candidate venues are selected based on a type of venue (e.g., coffee shops) or a venue name (e.g., McDonald's). In some implementations, the candidate venues are selected based on preferences of a user or history of venue inference. In some implementations, two or more criteria are applied to identify the candidate venues.

The venue inference method 400 for social media messages described herein can identify the location of a message at a specific venue, which simultaneously indicates the geographic location at a very fine-grained granularity and the venue name that is associated with the message. Inferring the location and venue name of non-geotagged social media messages can facilitate better understanding of users' geographic context, thus allowing applications to more precisely present information, recommend services, and target advertisements. Furthermore, the venue inference system 100 and method 400 described herein can be evaluated using a large-scale dataset of social message postings and venues from social media platforms.

Figure 8:
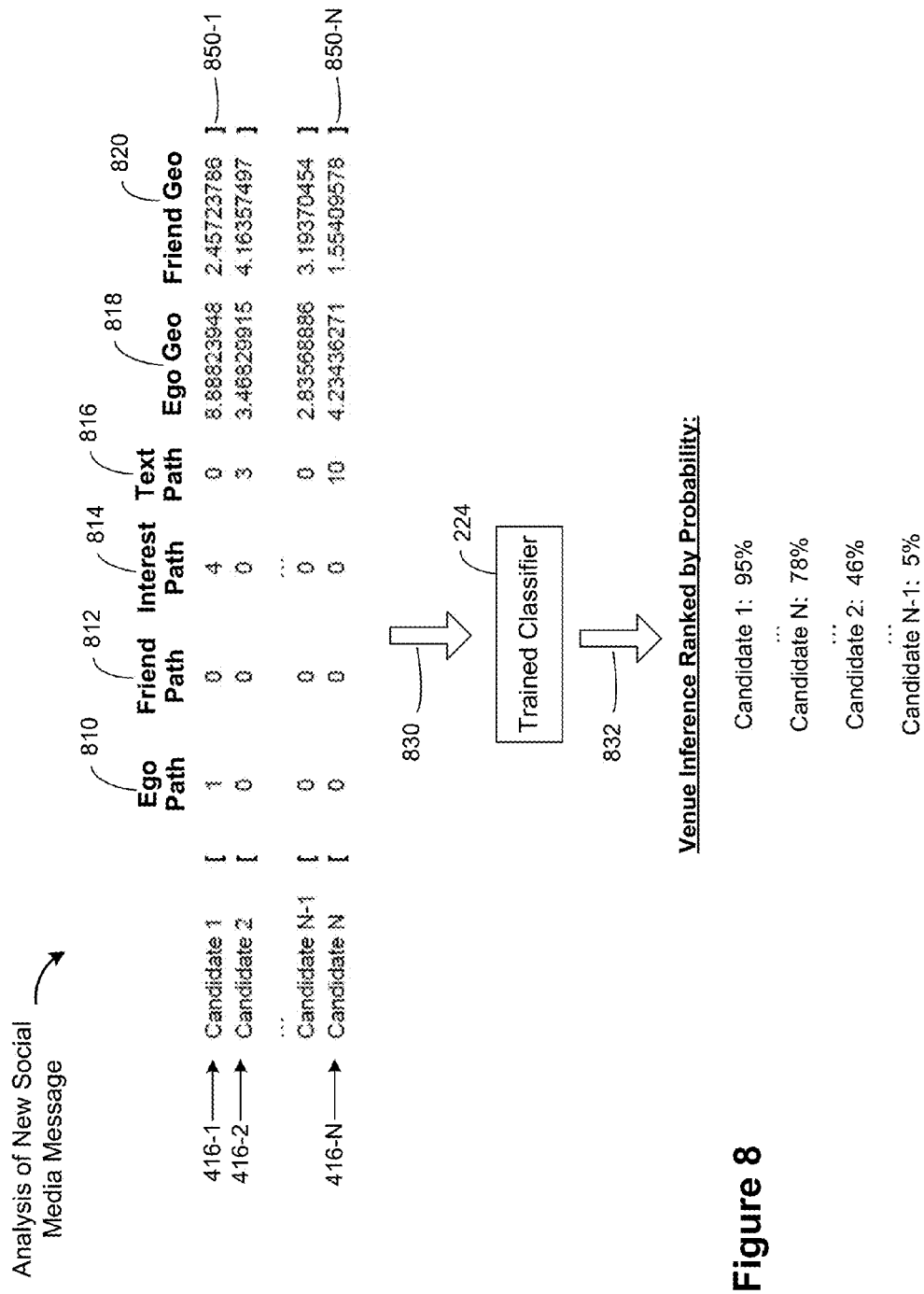
FIG. 8 provides a process flow using a trained classifier for inferring venues from social media messages in accordance with some implementations.

As illustrated in FIG. 4, the classification module 114 uses the postings 402 and the geo-located venues 404 to train one or more classifiers 224 in a training phase 460. For each (message, venue) pair, the classification module computes (406) features based on meta-paths and geo-coordinate information. Meta-paths are illustrated below with respect to FIGS. 5 and 6A, and geo-coordinate information is described below with respect to FIGS. 6B and 6C. The features are grouped together to form feature vectors 226 as illustrated in FIGS. 7 and 8 below. Each feature vector also has an associated label, which indicates whether the respective message 228 is associated with the respective venue 230.

In some implementations, the meta-paths are categorized into types, with distinct features corresponding to each path type. This is illustrated below in FIG. 6A. The classification module 114 uses (408) the feature vectors and associated labels to train a classifier 224 to classify whether a social media message is linked to a venue. The training process builds (e.g., iteratively) a classifier 224 (a trained model 410).

The training process can use various machine learning techniques. Some implementations use an SVM implemented in SCIKIT-LEARN7 with a linear kernel and default parameters. In some implementations, a separate classifier 224 is created for each venue (e.g., each of the geo-located venues 404). In some implementations, a single classifier is created, and the classifier is used to identify a most likely venue based on the provided input. In some implementations, a single classifier is created, and the classifier is used to compute probabilities for a plurality of venues based on a single input vector.

In a second phase 470, a new social media message 412 is received by the server system 104 from an external service 122. In some instances, the posting 412 is not geotagged (i.e., is not assigned geographic coordinates). The trained model 410 (i.e., a classifier 224) classifies (418) whether the posting 412 is linked to each of the candidate venues 416. In order to perform the classification (418), the classification module 114 builds a feature vector as described above for the training stage. In particular, the classification module 114 computes (414) meta-path features and geo-features corresponding to the features used in the training phase.

In some implementations, the trained classifier 224 computes a score (e.g., probability) for each candidate venue 416, which indicates a likelihood that the new social media message is linked to the candidate venue. Based on the scores, the classification module identifies (420) at least one candidate venue as the estimated venue for the new social media message and associates the estimated venue with the new social media message. In some implementations, the classification module 114 selects (420) two or more of the most probable candidate venues when there are multiple venues that are ranked highly. The selected candidate venues are provided as the estimated venue 422.

In some implementations, computing the meta-paths for the feature vectors uses a heterogeneous social network graph 232. The graph 232 shows the embedded social relations, and can leverage available but limited geographic data to identify when social media messages are associated with geographic venues.

In FIG. 5, each type of entity is represented as a type of node in the social network schema 500. For example, there are separate nodes for each Twitter user 502, each Foursquare user 504, each venue 506, each tweet 508, and each Foursquare tip 510. In this figure, summary nodes are drawn that represent conceptually many individual nodes in the actual social network graph 232. In this example, there are 251,660 individual Twitter users, so there would be 251,660 individual nodes for Twitter users if the graph 232 were not presented in this summary form. Similarly, there are 105,340 Foursquare users, 337,991 venues, 10,080,973 tweets, and 400,941 Foursquare tips. In addition, some implementations have category nodes 512, which group together related venues. This is, each venue many be assigned to one or more categories. Some implementations also provide word nodes 514, which are individual words that appear in tweets or Foursquare tips. Typically, the words are limited to meaningful content words, which would exclude words such as articles, conjunctions, and prepositions. For example, some implementations remove stop words using the NLTK from http://www.ntlk.org. Some implementations filter out words that appear in less than a threshold number (e.g., 10) of the social media messages in the training set. Note that the term "word" is used broadly, and does not require a word to appear in a published language dictionary. For example, social media messages commonly contain many abbreviations, acronyms, or other sequences of letters that function as words. For example, "lol" and "lgtm" would be considered words (although these two words are not necessarily useful here).

Relationships between the entities are represented as different types of links. For example, a Twitter friend link 520 links two Twitter users who are friends and a Foursquare friend link 522 links two Foursquare users who are friend. An "anchor" link 524 indicates that a Twitter user 502 is the same person as the corresponding Foursquare user 504. A Twitter write link 526 connects a Twitter user 502 to a tweet 508 that the Twitter user writes. A checkin link 528 indicates that a Twitter user 502 has checked in at a specific venue 506. A mayor link 530 indicates that a specific Foursquare user 504 has been designated as a mayor of a specific venue 506. A Foursquare write link 532 links a Foursquare user 504 to a tip 510 written by the Foursquare user 504. Each Foursquare tip 510 relates to a specific venue 506, so there is a locate link 534 to indicate the relationship.

When the social network schema 500 includes venue categories 512, there are "belong" links 536 to indicate that a venue 506 belongs to a category 512. Note that a single venue may belong to two or more categories. On the other hand, some venues 506 may not belong to any of the identified categories 512.

When the social network schema 500 includes word nodes 514, the schema 500 includes tweet contain links 538 that indicate when a tweet 508 contains a specific word. Similarly, there are tip contain links 540 that indicate when a Foursquare tip 510 contains a specific word.

As indicated by the dotted line 550, some tweets 526 are associated with venues 506. Disclosed implementations are able to infer the tweet-venue links 550 in some cases based on other information in the social network graph 232.

Disclosed implementations infer the geographic venue where a non-geotagged tweet (or other social media message) was posted. Table 1 below lists four examples of geotagged tweets. Based on analysis of the dataset, most of the tweets sourcing from Foursquare are in the format "I'm at somewhere," which makes it easy to infer a venue. In some implementations, the Twitter checkin links 528 are explicitly added as a type of link based on these types of tweets.

TABLE 1

Examples of geotagged tweets

| | |
|---|---|
| $t_1$ | I'm at Whole Foods Market - @wholefoodsnorca (San Francisco, CA) w/4 others [Foursquare] |
| $t_2$ | I'm at @Pier39 (San Francisco, CA) w/6 others [Foursquare] |
| $t_3$ | BEST BURGERS EVER WITH @username?? @ Smashburger [Instagram] |
| $t_4$ | New insurance = Massive headaches at the pharmacy.? (at @walgreens) [Path] |

Note:
The source of each tweet is indicated in brackets.

In some implementations, the dataset used to build the social network graph 232 includes geotagged tweets from sources other than Foursquare. Similar to Foursquare, several other mobile applications (e.g., Instagram, Path) enable users to tag their posts with geographic information. As shown in Table 1, the symbol "@" can be followed by a venue name in geotagged tweets (e.g., @walgreens in $t_4$). However, the symbol "@" can also be used to identify another user (e.g., @username in $t_3$).

The dataset illustrated in FIG. 5 consists of a subset of tweets from a larger dataset. The selected subset of tweets are those whose text contains a venue name or at least half the content words in venue name (to account for abbreviations). Additionally, in order to disambiguate actual venues from user-mentions with "@," the geo-location of the selected tweets was required to be in the neighborhood of the matching venue. In this example, a neighborhood was defined to be a radius of 0.0008 degrees, or about 290 feet. In this way, the actual venues for 126,917 tweets are obtained. Words following "@" were removed from tweets for model learning and testing using cross-validation. The coordinates of tweets were also withheld, except for usage in evaluation. Overall, each tweet is treated as if it were non-geotagged when a model is trained.

Using a social network graph 232 as illustrated conceptually by the schema 500 in FIG. 5, different types of meta-path can be extracted. Applying venue inference to social media messages that are tweets can be formalized as:

given a non-geotagged tweet estimate the tweet's probability of being posted at a venue $v_p$, $Pr(link(t_i|v_p))$, so that the venue with the maximum probability $v_{est}(t_i)$ is the tweet's actual venue $v_{act}(t_i)$.

As used herein, a meta-path within the social network schema 500 contains a sequence of individual links between nodes. For example, in FIG. 5, a meta-path $$\text{``tweet} \xrightarrow{write} \text{word} \xrightarrow{contain^{-1}} \text{tip} \xrightarrow{locate} \text{venue,''}$$

denotes a composite relationship from tweets to venues. The semantic meaning of this meta-path is that the tweet and the venue share common words via Foursquare tips. The link type "contain$^{-1}$" represents the inverted relation of "contain." The tweet and venues connected through the meta-path are more likely to be linked than those without such metapaths.

Different meta-paths usually represent different relationships among linked nodes with different semantic meanings. For example, the meta-path $$\text{``tweet} \xrightarrow{write^{-1}} \text{Twitter user} \xrightarrow{anchor} \text{Foursquare user} \xrightarrow{mayor} \text{venue''}$$

denotes that the tweet was posted by a Twitter user who is a mayor of the venue in Foursquare. The meta-path $$\text{``tweet} \xrightarrow{write^{-1}} \text{Twitter user} \xrightarrow{friend} \text{Twitter user} \xrightarrow{checkin} \text{venue''}$$

indicates the tweet was posted by a Twitter user whose friend checks in at the venue. In this way, relationships between tweets and venues can be described by different meta-paths with different semantics.

FIG. 6A illustrates four types of meta-paths that can be constructed from the social network graph 232. An EgoPath 602 directly relates a user's tweets to venues. Given a tweet-venue pair $(t_i, v_p)$, the user who posted the tweet $t_i$ is denoted as $u_i$. To infer the probability of the link $(t_i, v_p)$, it would be useful to know if the user $u_i$ has any type of direct interactions with the venue. Examples of direct interaction include check in at the venue, writing a tip about the venue, or being a mayor of the venue. These are referred to herein as direct venue interactions.

The meta-path $$\text{``tweet} \xrightarrow{write^{-1}} \text{Twitter user} \xrightarrow{anchor} \text{Foursquare user} \xrightarrow{mayor} \text{venue''}$$

identifies when a tweet $t_i$ was posted by the a user $u_i$ who is a mayor of the venue $v_p$ in Foursquare. The tweet $t_i$ is more likely to be associated with the venue $v_p$ if there exists such a meta-path from $t_i$ to $v_p$ than those venues without such connections. Similarly, other meta-paths are extracted to capture the correlations between a tweet $t_i$ and a venue $v_p$ via a user $u_i$ as illustrated by the sample paths in the EGOPATH section 602 in FIG. 6A.

A FriendPath 604 relates a user's tweets to venues through their friends. Although EGOPATH can be expected to be very important to represent the correlations between a tweet $t_i$ and a venue $v_p$ by leveraging explicit social activities of the user $u_i$ across Twitter and Foursquare, it is observed that only a small number of tweets can be inferred in this way. Particularly for users who do not have linked Foursquare accounts, very few EGOPATHs are present. It has been observed in some research that social relationships can explain about 10% to 30% of all human movement. Therefore, in addition to looking at the social activities of the user $u_i$ one can also exploit the activities of the user's friends. When a friend $u_j$ has any direct venue interactions at the venue $v_p$, the user $u_i$ is more likely to post the tweet $t_i$ at the venue $v_p$ than those venues without such connections. For example, the meta-path $$\text{``tweet} \xrightarrow{write^{-1}} \text{Twitter user} \xrightarrow{friend} \text{Twitter user} \xrightarrow{checkin} \text{venue''}$$

identifies when friends of the user $u_i$ have checkins at the venue $v_p$. The meta-paths leveraging friends' information is denoted as FRIENDPATH 604, as illustrated by the sample paths in FIG. 6A.

An Interest Path 606 expands the relationship between tweets and venues through venue categories (e.g., Foursquare categories). Taking into consideration the user interests, users tend to tweet at similar venues that attract their interests. For example, suppose $v_p$ is Chef Chu's in Los Altos, Calif., $v_q$ is Cooking Papa in Mountain View, Calif., and both of these venues belong to the category "Chinese restaurant." If a user $u_i$ has checkins at $v_q$, it indicates an interest in Chinese food, so a tweet $t_i$ from the user $u_i$ is more likely to be posted by the user $u_i$ at the venue $v_p$ than those venues without such connections. In the sample data collected from Foursquare illustrated in FIG. 5, each venue is associated with one or more of the 429 categories, as illustrated by the belong links 536 in FIG. 5. The meta-path $$\text{``tweet} \xrightarrow{write^{-1}}$$
$$\text{Twitter user} \xrightarrow{checkin} \text{venue} \xrightarrow{belong} \text{category} \xrightarrow{belong^{-1}} \text{venue''}$$

can effectively detect whether the tweet $t_i$ was posted by a user who has checkins at venues sharing the same category as $v_p$. Some sample meta-paths that use category are listed in the INTERESTPATH 606 section in FIG. 6A.

A Text Path 608 models the words tweeted about venues. Unlike conventional approaches that focus on text processing for content analysis, words are represented as a type of node in the constructed social network schema in FIG. 5. A meta-path via words is defined to represent textual similarity between tweets and venues. For example, the meta-path $$\text{``tweet} \xrightarrow{contain} \text{word} \xrightarrow{contain^{-1}} \text{tip} \xrightarrow{locate} \text{venue,''}$$

denoted as TEXTPATH 608, can encode when the tweet $t_i$ and the venue $v_p$ share common words via Foursquare tips. A tweet $t_i$ is more likely to be associated with a venue $v_p$ sharing similar textual content than a venue without such connections. Although the TEXTPATH 608 section of FIG. 6A identifies a single sample meta-path of this type, some implementations use many other Text Paths as well. As illustrated below in FIG. 11A, some social network schemas 500 include venue-links 1102. In this case, one tweet can be connected to a venue (such as the no-venue node) based on another tweet that is linked. For example, in the meta-path $$\text{"tweet}_1 \xrightarrow{contain} \text{word} \xrightarrow{contain^{-1}} \text{tweet}_2 \xrightarrow{venue\text{-}link} \text{venue,"}$$

the first tweet shares words that are contained in a second tweet that is linked to a venue.

Some implementations use the four meta-path types EGOPATH 602, FRIENDPATH 604, INTERESTPATH 606, and TEXTPATH 608 to generate features for the feature vectors. However, one of skill in the art recognizes that different or additional meta-paths may be used. For example, when the social media messages are other than tweets, different information may be available, creating different node types and thus different meta-path types.

Based on the defined meta-path types, the classification module computes path counts for each of the meta-path types, and uses the counts as the features in the feature vectors. These features are used both for the training feature vectors 226, as well as the feature vectors for new received messages. In some implementations, the path counts are summed for each of the general meta-path types (e.g., all of the EGOPATH counts are summed together). In other implementations, there are separate features for each specific path type (e.g., there are three separate features for EGOPATHS, each corresponding to one of the EGOPATH types shown in FIG. 6A).

In some implementations, the classification module 114 also calculates geo-features, as illustrated in FIGS. 6B and 6C. The geo-features represent available geographic information contained in geotagged tweets of the user or the user's friends. The geo-features can be used as additional features in the feature vectors. Note that the geo-features are based on the geographic coordinates (geotagging) of the social media messages used in the training process, and not geographic coordinates of new social media messages where a venue inference is desired. (When geographic coordinates of message are provided, it is generally a much simpler task to identify the venue.)

In some implementations, there are two types of geo-features that are used in the feature vectors. A first geo-feature is an EGOGEO score, as illustrated in FIG. 6B. In some implementations, the EGOGEO score is used to facilitate venue inference for a tweet $t_i$ if the classification module 114 has geographic information of other tweets posted by the user $u_i$. Let $T_i$ denote the set of geotagged tweets posted by the user $u_i$. Some implementations define the EGOGEO geographic correlation between a tweet $t_i$ and a candidate venue $v_p$ as:

$$EGOGEO(t_i, v_p) = -\log\left(\min_{t_j \in T_i - t_i} \|t_j - v_p\|_1 + \epsilon\right)$$

as illustrated in FIG. 6B. For the innermost subtraction $t_j - v_p$, the two elements $t_j$ and $v_p$ are considered as two dimensional vectors of geographic coordinates. For example, the coordinates are typically degrees of longitude and degrees of latitude corresponding to the geotagging of the tweet $t_j$ and the venue $v_p$. The $L^1$ norm $\|\cdot\|_1$ is sometimes referred to as the "Manhattan distance," which adds up the absolute differences for the two coordinates. Some implementations use alternative distance calculations, such as Euclidean distance $\|\cdot\|_2$. The expression $$\min_{t_j \in T_i - t_i}$$

indicates that the formula takes the minimum of the computed distances. Even if the tweet $t_i$ itself is geotagged, it is excluded from the calculation. Note that the expression "$t_j \in T_i - t_i$" is shorthand for $t_j \in T_i - \{t_i\}$. Because the minimum distance could be zero (or nearly zero), a small term $\epsilon$ is added to avoid underflow. In some implementations, $\epsilon = 10^{-9}$. Because a smaller distance between a tweet and a venue indicates a higher probability of correlation, the formula computes the negative logarithm of the result. In some implementations, the logarithm is the common base 10 logarithm, but any another logarithmic base could be used instead, such as e or 2. In some implementations, the "no-venue" is assigned a default geolocation, such as (0,0). In some implementations, the no-venue is not considered to have a geolocation coordinates. In some implementations, the no-venue is assigned a default location based on other criteria (e.g., outside of the region where the user is generally located).

This formulation for EGOGEO measures the closest distance between geotagged tweets of the user who posted $t_i$ and a candidate venue $v_p$. Intuitively, the tweet $t_i$ is more likely to be associated with a venue $v_p$ when the user $u_i$ has posted one or more geotagged tweets in the neighborhood of the venue $v_p$. Thus higher values of EGOGEO($t_i$, $v_p$) indicate a higher probability of the link ($t_i$, $v_p$).

A FRIENDGEO score is similar to EGOGEO, but is based on geotagging of social media messages by a user's friends. For example, if a user is visiting a new neighborhood and creates a social media message, there may be no relevant geotagged social media messages from the user. However, because people commonly hang out with friends, the geotagged social media messages of the friends may indicate where the user is. Some implementations define the FRIENDGEO geographic correlation between a tweet $t_i$ and a candidate venue $v_p$ as:

$$FRIENDGEO(t_i, v_p) = -\log\left(\min_{t_j \in T_k, u_k \in N_i} \|t_j - v_p\|_1 + \epsilon\right)$$

as shown in FIG. 6C. The expression $\|t_j - v_p\|_1$ has the same meaning as in the EGOGEO formula 6B, as described above. Here $N_i$ is the set of users who are friends of the user $u_i$, and for each user $u_k$ in the set $N_i$, the set $T_k$ consists of the tweets by the user $u_k$. That is, the minimum is computed over all geotagged tweets by friends of the user $u_i$.

This formulation for FRIENDGEO measures the closest distance between geotagged tweets of the user's friends and a candidate venue $v_p$. If the user's friends have posted any geotagged tweet in the neighborhood of the venue $v_p$, the tweet $t_i$ is more likely to be associated with the venue $v_p$ than venues without such correlations. Therefore, the probability of a link ($t_i$, $v_p$) is likely to be positively correlated with FRIENDGEO($t_i$, $v_p$).

FIG. 7 illustrates feature vectors for some (social message, venue) pairs. For each (message, venue) pair, the corresponding feature vector (e.g., the feature vectors 226-1, 226-2, 226-3, 226-4, 226-5, and 226-6) includes path counts such as the ego path 702, friend path 704, interest path 706, and text path 708. In some implementations, each feature vector 226 includes geo features as described above with respect to FIGS. 6B and 6C. Some implementations include an Ego Geo feature score 710 and Friend Geo score 712 for each feature vector. Each feature vector 226 also has an associate label 720, which indicates whether the respective social media message and venue are known to be associated. In some implementations, a label value of 1 indicates the respective message and venue are associated and a label value of 0 indicates that the respective message is not associated with the respective venue. Other implementations use alternative encodings for the labels, such as 1 and −1, or other pairs of unique values.

In the sample data in FIG. 7, the label 720 is "1" for the first feature vector 226-1, which indicates that the tweet whose tweet identifier 722 is "918372" is associated with the venue whose venue identifier 724 is "1038." The corresponding feature vector 226-1 has 5 ego paths, 0 friend paths, 12 interest paths, and 3 text paths. In addition, the feature vector 226-1 has an Ego Geo score 710 of 8.72326584, which is calculated as described above with respect to FIG. 6B. The feature vector 226-1 also includes a Friend Geo score 712 of 8.72692089, which is calculated as described above with respect to FIG. 6C.

In some implementations, experiments can be conducted in the setting of 3-fold cross-validation. In each fold of training data, half of the known links between tweets and venues are sampled as positive links. For links in the other half, a venue $v_q$ can be randomly selected from $V-\{v_p\}$ to form a negative link $(t_i, v_q)$. In this way, a balanced dataset, such as the one depicted in FIG. 7 can be derived for the training process, containing the same number of positive links and negative links. Known links in the test set can be used for evaluation.

FIG. 8 illustrates venue inference for a new social message. For this new message there are N candidate venues 416-1, . . . , 416-N. For each of these candidate venues, the classification module 114 computes a respective Ego Path 810. For example, if the social network graph 232 is based on Twitter and Foursquare, the classification module uses the EgoPaths 602 identified in FIG. 6A. The classification module 114 also computes a respective Friend Path 812, a Respective Interest Path 814, and a respective Text Path 816 for each of the candidate venues 416. For Twitter/Foursquare, the classification module uses FriendPaths 604, InterestPaths 606, and TextPath 608, as illustrated above in FIG. 6A. These features are computed in the same way as the corresponding features in the training feature vectors 226. In some implementations, the classification module 114 also computes an Ego Geo score 818 and Friend Geo score 820 for each of the candidate venues 416. In some implementations, these are computed as described with respect to FIGS. 6B and 6C.

The features for each candidate venue 416 are placed into a respective feature vector 850, such as the feature vector 850-1 corresponding to the first candidate venue 416-1 and the Nth feature vector 850-N corresponding to the Nth candidate venue 416-N. These test feature vectors 850 are used as input (830) for the trained classifier 224, as illustrated above in box 418 in FIG. 4. The classifier 224 estimates (832) the probability that the new message is linked to each of the candidate venues. In some implementations, the candidate venues are ranked by probability of being linked to the new social media message.

In the example of FIG. 8, ranking from the highest to lowest, the probabilities for candidate venues 1, N, 2, and N−1 are 95%, 78%, 46%, and 5%. The new message is linked to the first candidate venue 416-1 by 1 ego path and 4 interest paths. The first venue 416-1 also has the highest Ego Geo score 818 relative to other candidate venues shown in FIG. 8. In contrast, the (N−1)th candidate venue has no ego paths, no friend paths, no interest paths, and no text paths. The (N−1)th candidate venue also has the lowest Ego Geo score 818. The new message is thus more likely to be associated with the first candidate venue 416-1 and is less likely to be associated with the (N−1)th candidate venue. In some implementations, the probabilities for each of the candidate venues are normalized so that the total adds up to 100%.

Figure 9A:
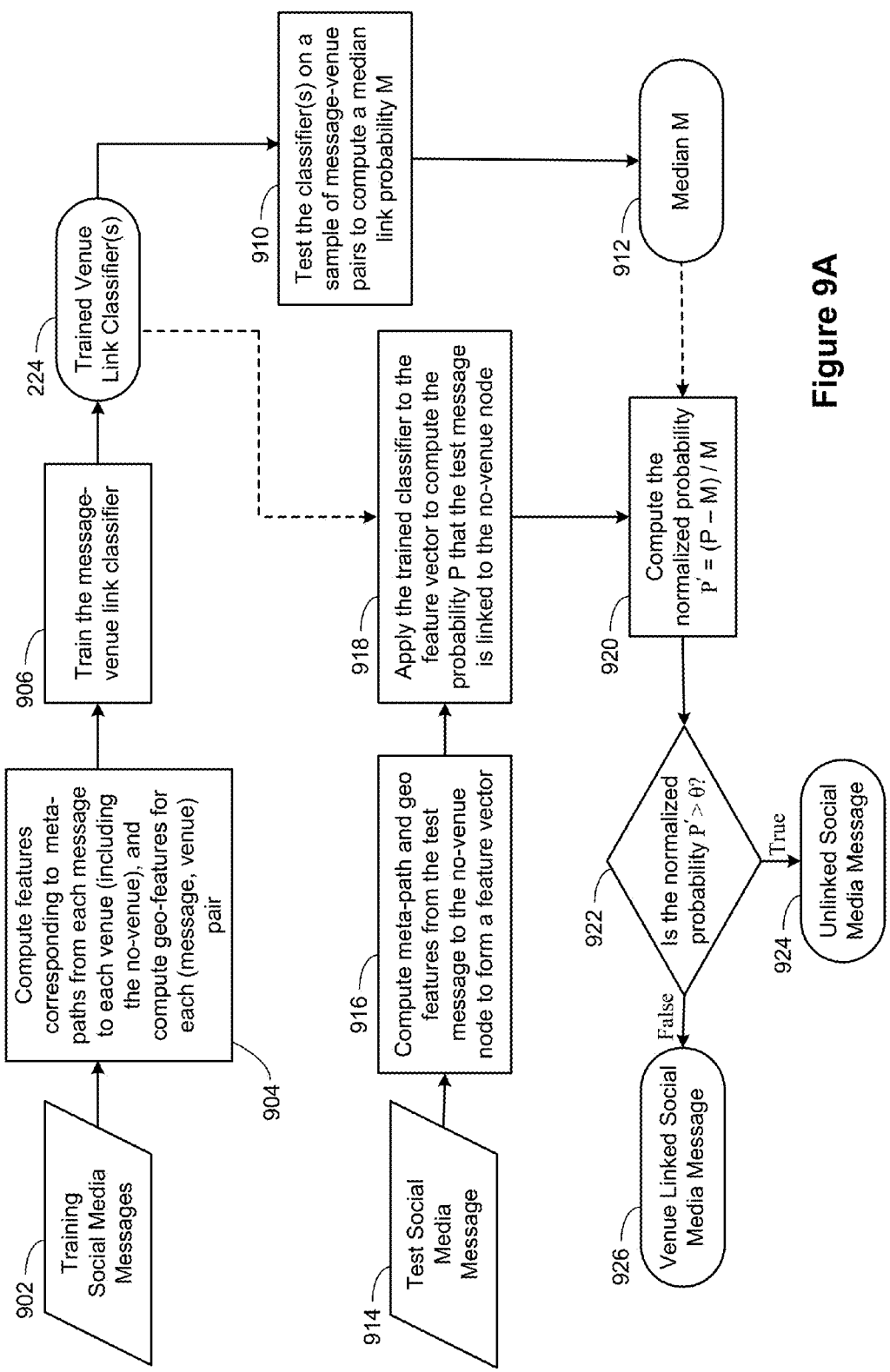
FIGS. 9A and 9B provides process flows for training and using a venue link detection system in accordance with some implementations.
Figure 9B:
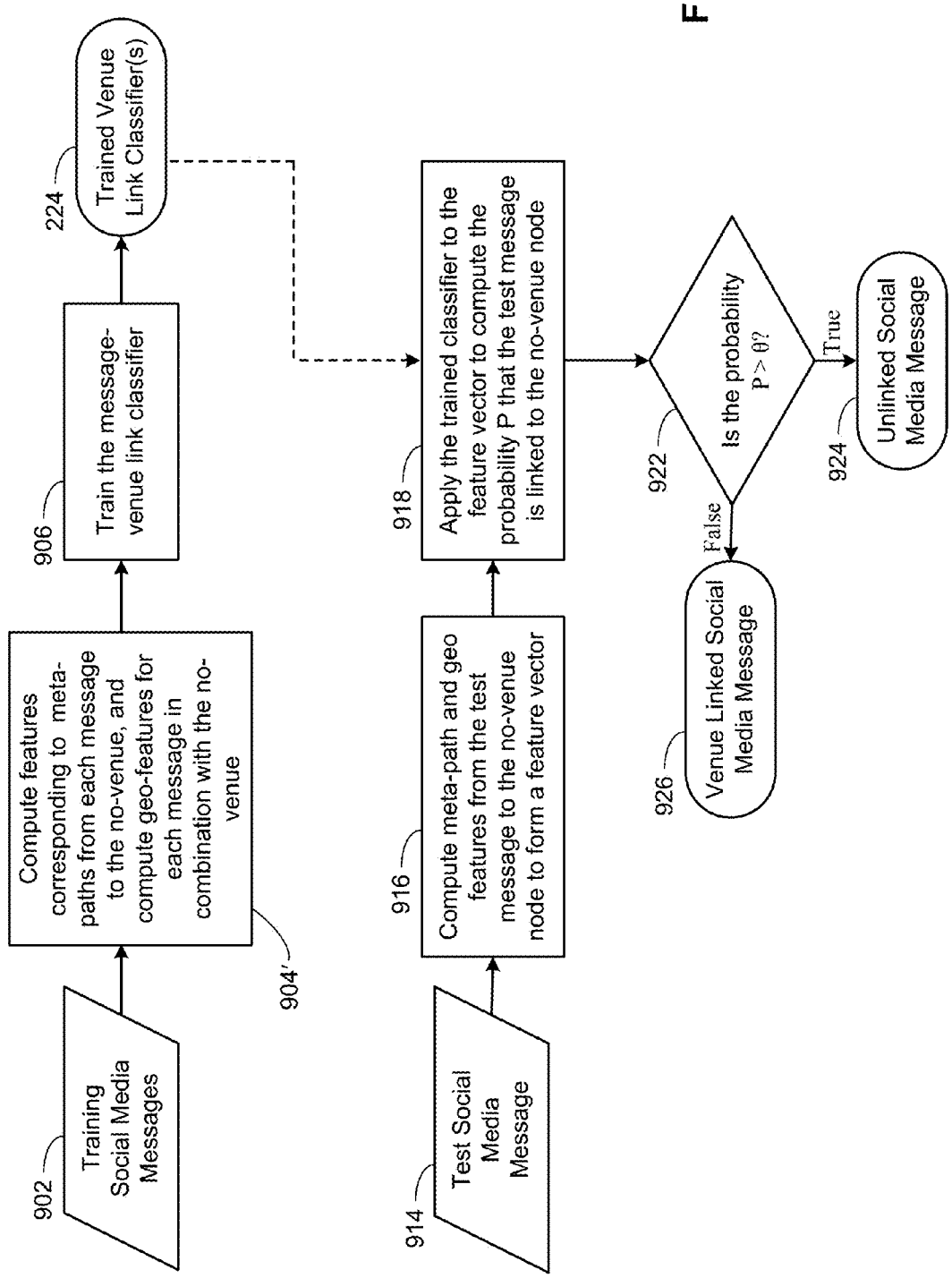

The process described above (e.g., in FIGS. 4 and 8) computes a probability for each of the candidate venues, but does not answer the question of whether the new social media message is associated with any venue at all. FIGS. 9A and 9B illustrate two processes that answer this question.

In FIG. 9A the training phase begins with a set of social media messages 902. For each of these training messages, it is known whether the message is associated with some venue. As above, a social network graph 232 is used to compute (904) features based on meta-paths and geo-coordinates for each of the venues, including the no-venue node. Links and paths to the no-venue node are described below in FIGS. 11A and 11B. In some implementations, geo-features such as EGOPATH and FRIENDPATH are computed for the no-venue node by assigning default geographic coordinates. For example, some implementations use (0,0) as the coordinates. Some implementations assign a default location associated with the no-venue node that is distant from the region where the user and the user's friends are located. Other implementations select a default location that is likely to be distant from most users, such as the North Pole, the South Pole, or the middle of the Atlantic Ocean.

Using training feature vectors 226 constructed from the meta-paths and geo-features, the classification module 114 trains (906) one or more message-venue link classifiers 224. In some implementations, the classification module 114 creates a distinct classifier 224 for each of the venues, including the no-venue node. Using the classifier(s) 224, the classification module 114 computes (910) a median link probability M. In general, most of the link probabilities are small and similar in value for a given trained model, so the median is one way to get an idea of a typical link probability. Some implementations use alternative techniques to estimate a typical link probability, such as a mode, or computing an arithmetic mean that excludes the outliers (e.g., the mean of the probabilities between the 25th and 75th percentiles).

In some implementations, the median M 912 is computed over a sample of venues.

After training the classifier(s) 224 and computing the median M 912, the process can be applied to a test social media message 914. The classification module 114 computes (916) the same meta-path features and geo-features to form a feature vector for the no-venue node in the social network graph 232. The trained classifier 224 uses the feature vector as input to compute (918) the probability P that the test message is associated with the no-venue node. The process then normalizes (920) the probability P using the median to compute a score. As illustrated in FIG. 10A, some implementations normalize (920) the probability by subtracting the median M and dividing the result by the median M, resulting in a score. In FIG. 10A, the expression $\Pr(\text{link } (t_i, v_0) | f_{io})$ indicates the probability of a link between the tweet $t_i$ (the test social media message 914 here) and the no-venue node $v_0$ based on the set of features $f_{io}$ for the pair $(t_i, v_0)$. As indicated in FIG. 10B, some implementations normalize the probability by subtracting the median M 912, and dividing by the total of all the link probabilities for the test social media message. In some cases, the denominator in Method B is substantially the same regardless of the social media message, so it can be computed a single time and reused.

The normalized probability P' is then compared (922) against a threshold value θ. In some implementations, the threshold θ is set to −0.0005 for the formula of Method A in FIG. 10A. In some implementations, the threshold θ is set to −0.000001 when the formula of Method B in FIG. 10B is used. When the normalized probability is greater than the threshold, the test social media message is designated (924) as unlinked. That is, when the social message is associated with the no-venue node, the message is not associated with any of the "real" venues. On the other hand, when the normalized probability is less than the threshold, the test social media message is designated (926) as linked to a message. In this case, some implementations perform a subsequent ranking operation to identify the most probable venue (e.g., using the training/using phase 470 in FIG. 4). Other venue ranking technique can be applied instead of, or in addition to, the specific techniques described with respect to FIG. 4.

FIG. 9B illustrates an alternative process that constructs a classifier 224 using only the no-venue node, and thus does not require normalization. The classifier 224 that is built estimates the probability that a test social media message 914 is associated with the no-venue node. Most of the operations in FIG. 9B are the same as in FIG. 9A, and thus the descriptions are the same. The computation (904') of features in FIG. 9B is different from the computation (904) in FIG. 9A because here only the no-venue node is used.

Figure 11A:
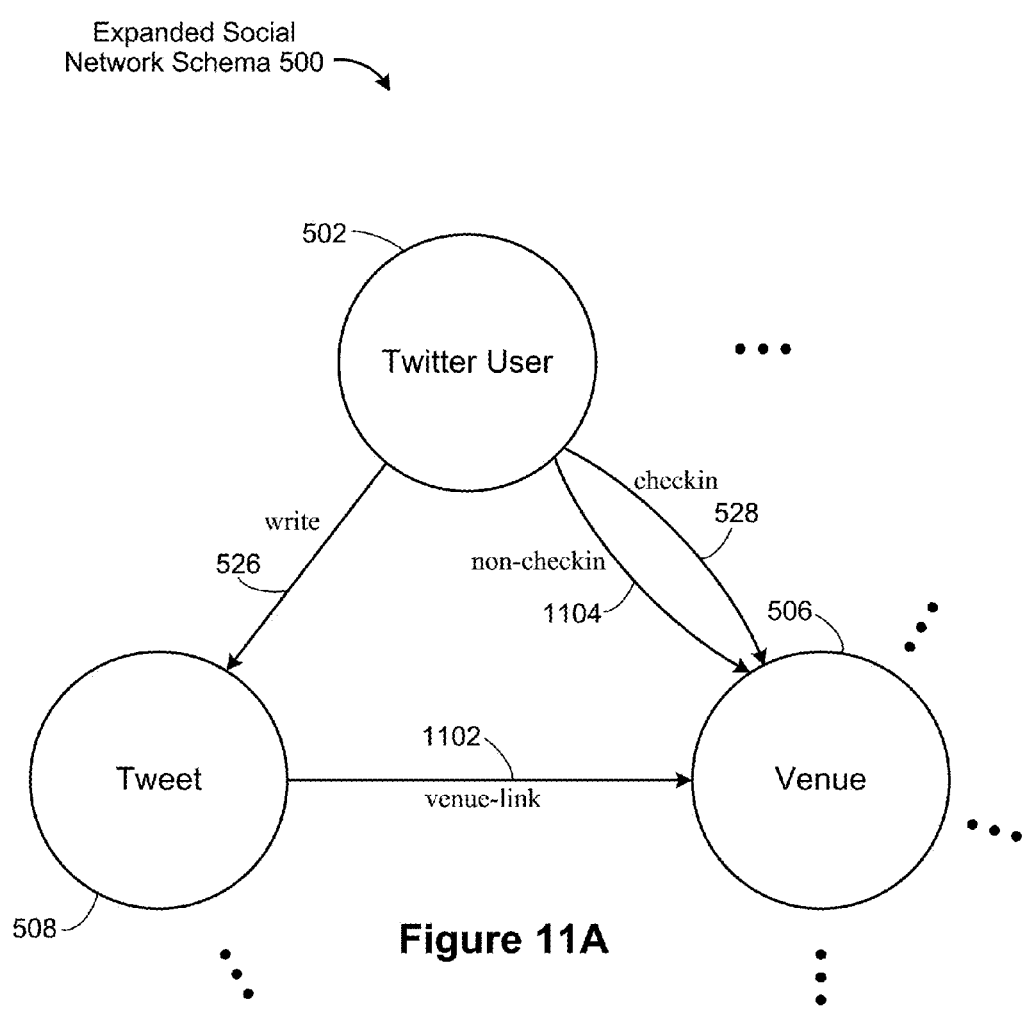
FIG. 11A illustrates additional links that may be added to a social network schema in accordance with some implementations.

FIG. 11A illustrates how the social network schema 500 of FIG. 5 can be expanded with additional types of links between the nodes. In some implementations, venue links 1102 are added between tweets and venues when there is an explicit mention of the venue in the tweet. For example, some implementations use techniques described in "Social Media-based Profiling of Business Locations," GeoMM '14 Proceedings of the 3rd ACM Multimedia Workshop on Geotagging and its Applications in Multimedia, pp. 1-6 (2014), which is hereby incorporated by reference in its entirety. In some implementations, if a tweet does not have a venue-link 1102 to any of the actual venues, then a venue-link 1102 is created between the tweet and the no-venue node. In some implementations, a venue-link 1102 is created between the tweet and the no-venue node only when there is reasonable certainty that the tweet is not associated with any of the real venues.

In some implementations, non-checkin links 1104 are created between a Twitter user 502 and the no-venue node when the Twitter user 502 has written (526) any tweets 508 that are linked to the no-venue node. In some implementations, a non-checkin link 1104 is created only for Twitter users 502 with a threshold number of tweets 508 linked to the no-venue node (e.g., 10, 20, or 100 such tweets). In some implementations, the threshold number of tweets has a specified length of time, such as a minimum number of tweets linked to the no-venue node within a day, a week, or a month.

Figure 11B:
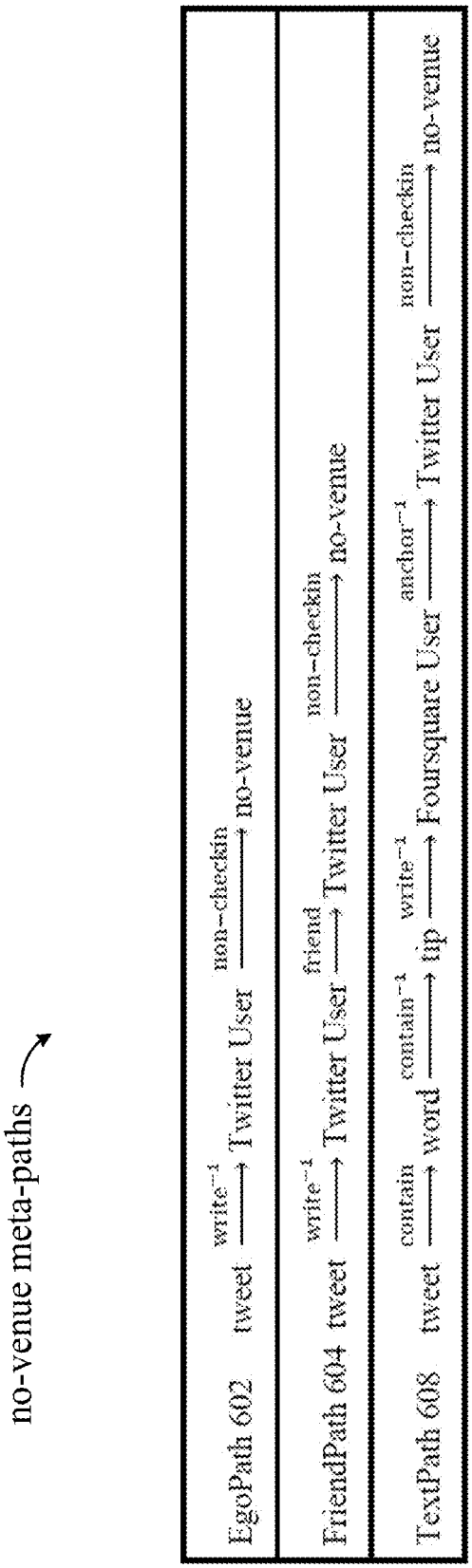
FIG. 11B identifies some meta-paths through a social network schema that connect tweets to the no-venue node in accordance with some implementations.

FIG. 11B illustrates some of the meta-paths through the social network schema 500 that connect tweets to the no-venue node. For example, there is an additional EgoPath 602, which connects a tweet to the no-venue node using a non-checkin link 1104, as described above with respect to FIG. 11A. When a user writes tweets that are not linked to a venue, the user is more likely to write additional tweets that are not venue linked.

FIG. 11B also illustrates an additional FriendPath 604, which connects a tweet to the no-venue node based on friends of a user creating tweets that are not linked to venues. This correlation is more tenuous, but the strength of the connection is built into the training process for the classifiers. A FriendPath 604 to the no-venue node can also be based on a Foursquare friend relationship 522.

FIG. 11B also illustrates an additional TextPath 608, which connects a tweet to the no-venue node based on one or more words in the tweet that correlate to words in a Foursquare tip.

Figure 12:
FIG. 12 provides a table of data that evaluates the performance of various venue link classifiers in accordance with some implementations.
Figure 13A:
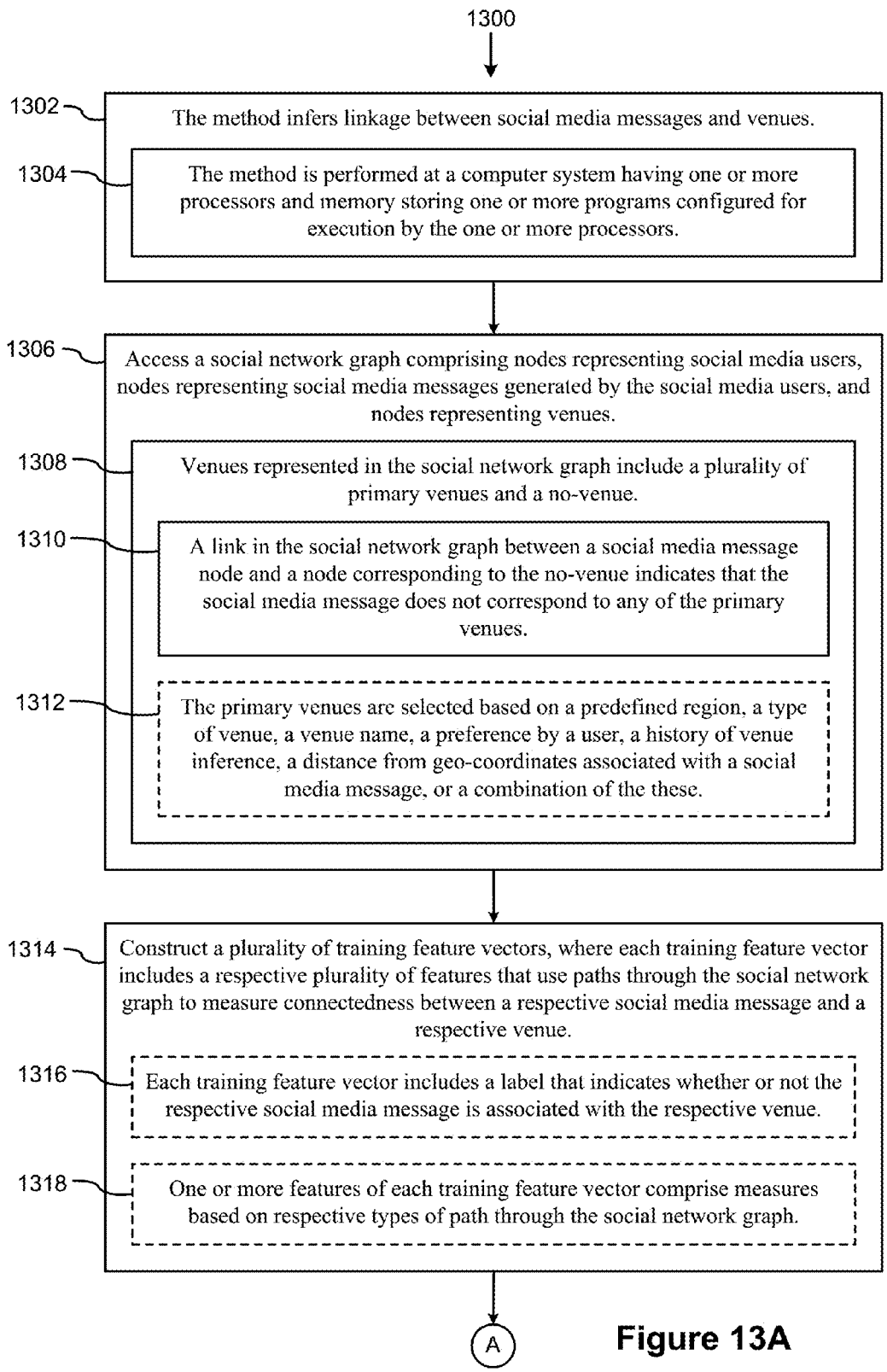
FIGS. 13A-13D provide a flowchart of a process for detecting venue links in accordance with some implementations.
Figure 13B:
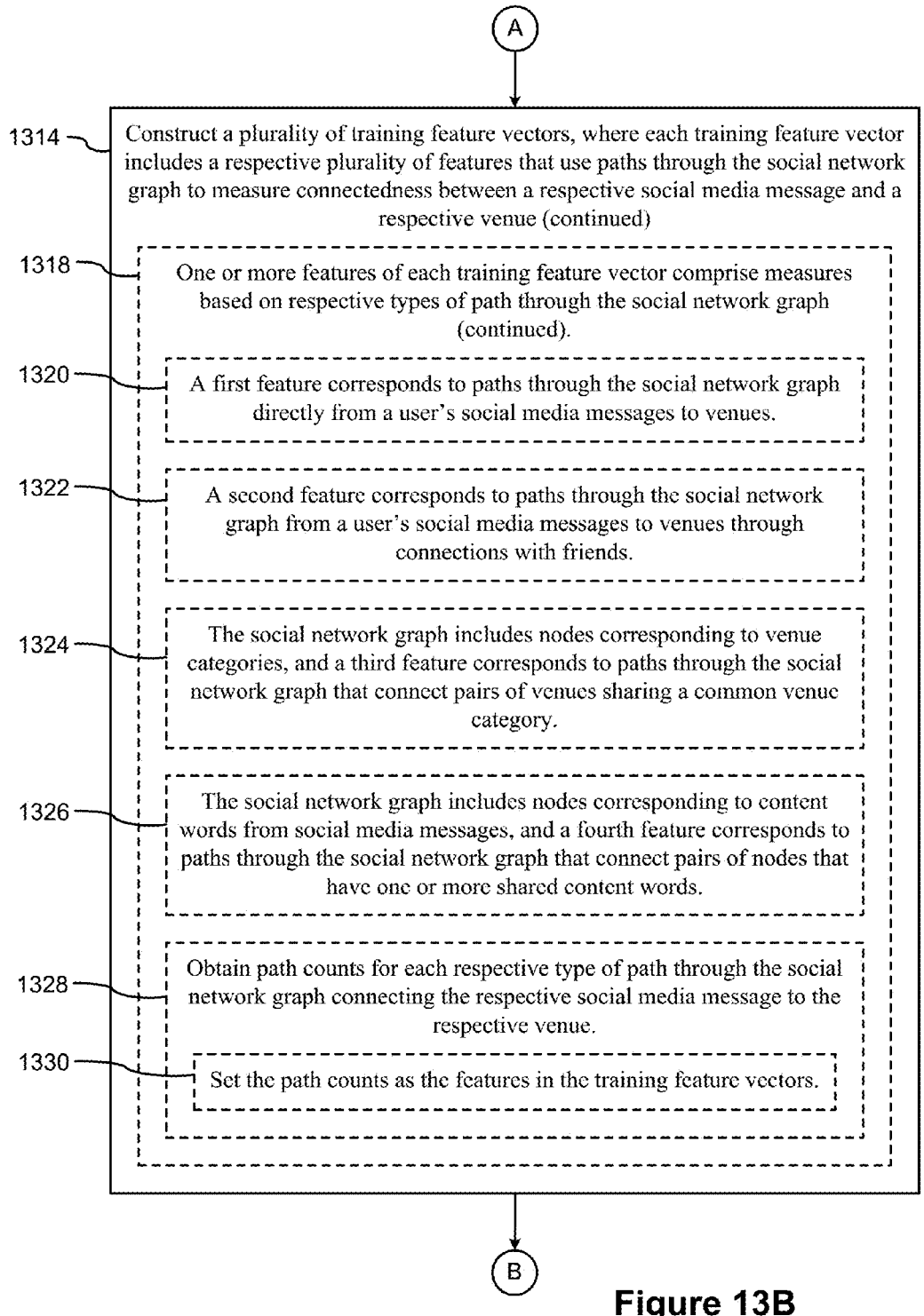
Figure 13C:
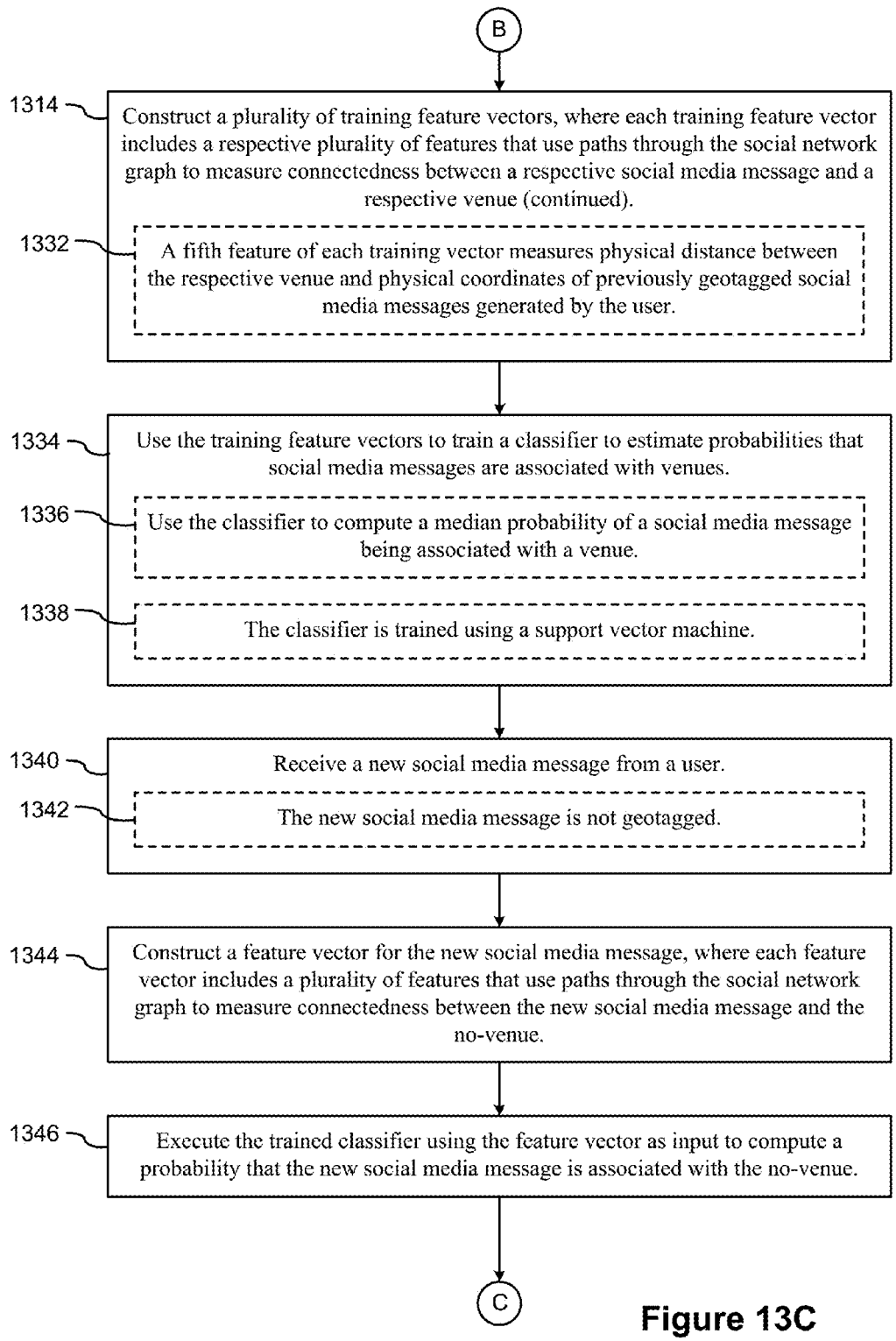
Figure 13D:
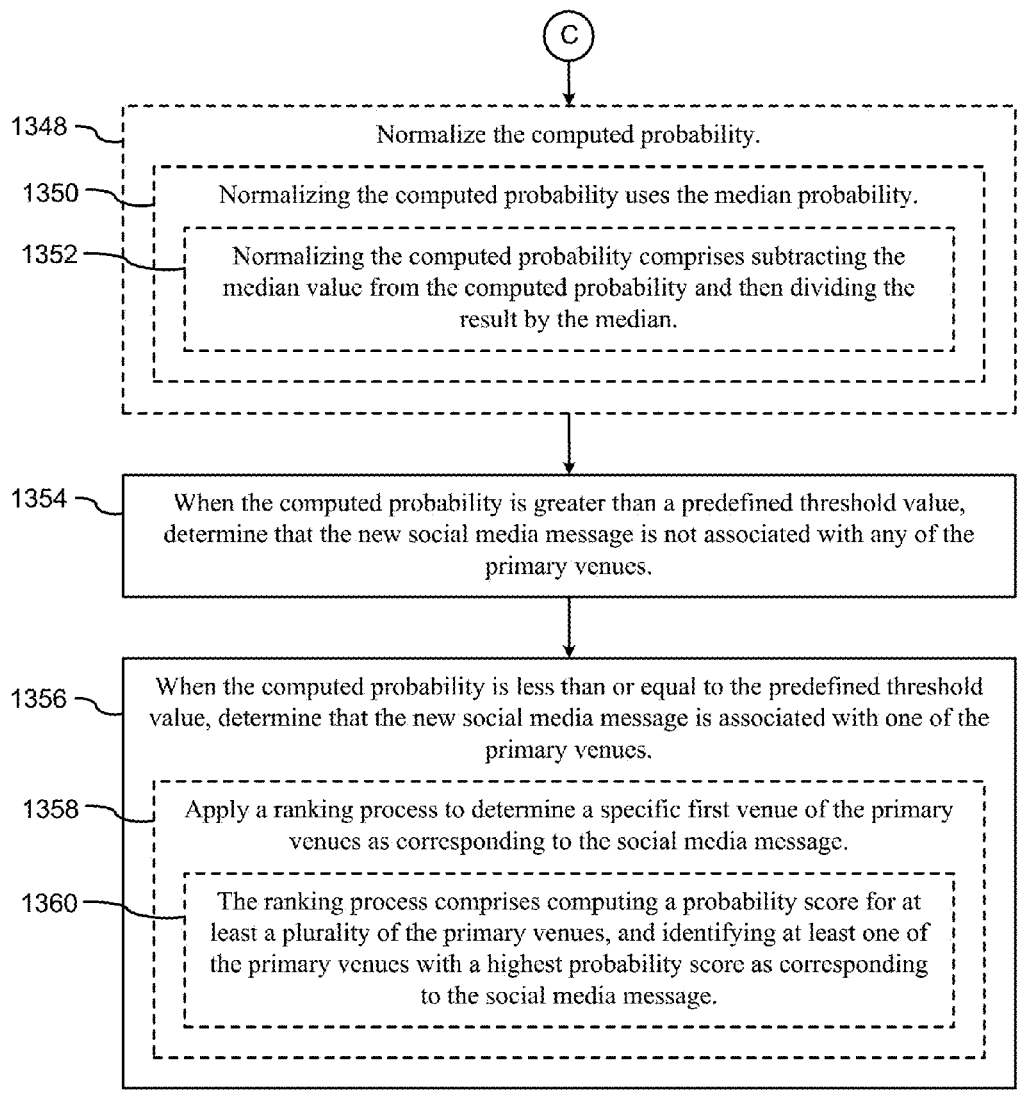

FIG. 12 provides a table of data that evaluates the performance of several alternative venue link classifiers. The table provides results from performing cross-validation on a random sample of tweet-venue links drawn from over 5.97 million tweets and over 19,000 possible venues. The left two result columns 1202 and 1204 compare performance using 3-fold cross-validation when the geo-features are used and ignored. These results indicate that including the geo-based features is not always helpful for tweet-venue link detection.

The right two columns 1206 and 1208 show results on a larger sample using 10-fold cross-validation. These columns are more indicative of general performance of the disclosed methods. The third column 1206 displays results from using Method A (see FIG. 10A), and the fourth column 1208 displays results of using a classifier trained only on the relationships between tweets and the no-venue node, as illustrated in FIG. 9B above.

In the first experiment 1202, a sample of 100 tweets was used, and the feature vectors used the four types of meta-paths described as well as geo-features corresponding to EGOGEO and FRIENDGEO. In the second experiment 1204, another sample size of 100 tweets was used, but no geo-features were used in the feature vectors. Both of these experiments had very high accuracy. The third experiment 1206 used a larger sample size for training, and omitted the geo-features. In the fourth experiment, only the no-venue node was used.

FIGS. 13A-13D provide a flowchart of a process 1300, performed by a computer system, for inferring (1302) linkage between social media messages and venues. The method is performed (1304) at a computer system having one or more processors and memory. The memory stores (1304) one or more programs configured for execution by the one or more processors.

The process accesses (1306) a social network graph 232 comprising nodes representing social media users, nodes representing social media messages generated by the social media users, and nodes representing venues. This is illustrated in FIG. 5 above. Venues represented in the social network graph include (1308) a plurality of primary venues and a no-venue node. The primary venues are the real venues, corresponding to actual physical locations, such as a specific restaurant, store, coffee shop, or museum. The "no-venue" node is a special venue node that does not represent a physical venue. A link in the social network graph between a social media message node and a node corresponding to the no-venue indicates (1310) that the social media message does not correspond to any of the primary venues. In some implementations, the primary venues are selected (1312) based on a predefined region, a type of venue, a venue name, a preference by a user, a history of venue inference, a distance from geo-coordinates associated with a social media message, or a combination of the these. For example, if the master list of venues includes all of the known venues in the United States, the vast majority of the venues are not relevant to a person who lives and works in a single city or metropolitan area.

As illustrated in FIGS. 9A and 9B above, one or more classifiers are constructed (1314) based on a set of training feature vectors 226. Each training feature vector includes a respective plurality of features that use paths through the social network graph to measure connectedness between a respective social media message and a respective venue. Typical paths are illustrated in FIG. 6A. As illustrated in FIG. 7, each training feature vector typically includes (1316) a label 720 that indicates whether or not the respective social media message is associated with the respective venue. In some implementations, one or more features of each training feature vector comprise (1318) measures based on respective types of path through the social network graph.

In some implementations, a first feature corresponds to (1320) paths through the social network graph 232 directly from a user's social media messages to venues, as illustrated by the EgoPaths 602 in FIG. 6A. In some implementations, a second feature corresponds to (1322) paths through the social network graph 232 from a user's social media messages to venues through connections with friends, as illustrated by the FriendPaths 604 in FIG. 6A. In some implementations, the social network graph 232 includes (1324) nodes corresponding to venue categories 512, and a third feature corresponds to (1324) paths through the social network graph 232 that connect pairs of venues sharing a common venue category, as illustrated by the InterstPaths 606 in FIG. 6A. In some implementations, the social network graph 232 includes (1326) nodes corresponding to content words from social media messages, and a fourth feature corresponds to (1326) paths through the social network graph 232 that connect pairs of nodes that have one or more shared content words 514, as illustrated by the TextPath 608 in FIG. 6A.

In some implementations, the process 1300 obtains (1328) path counts for each respective type of path through the social network graph 232 connecting the respective social media message to the respective venue, and sets (1330) the path counts as the features in the training feature vectors. This is illustrated in FIG. 7 above. In some implementations, a fifth feature of each training vector measures (1332) physical distance between the respective venue and physical coordinates of previously geotagged social media messages generated by the user. For example, the EGOGEO and FRIENDGEO calculations described with respect to FIGS. 6B and 6C measure physical distance between venues and previously geotagged social media messages.

The process 1300 then uses (1334) the training feature vectors to train (1334) a classifier 224 to estimate probabilities that social media messages are associated with venues. In some implementations, the training process uses (1338) a support vector machine. In some implementations, the trained classifier is used to compute (1336) a median probability of a social media message being associated with a venue, as illustrated in FIG. 9A above.

The process 1300 then receives (1340) a new social media message from a user. Typically the method 1300 is applied when the new social media message is (1342) not geotagged. The process 1300 then constructs (1344) a feature vector for the new social media message, where each feature vector includes a plurality of features that use paths through the social network graph to measure connectedness between the new social media message and the no-venue node. These features are computed in the same way that the features were computed for the training feature vectors 226. The process then executes (1346) the trained classifier using the feature vector as input to compute a probability that the new social media message is associated with the no-venue node. In some implementations, the computed probability is normalized (1348). In some implementations, normalizing the computed probability uses (1350) the computed median probability. In some implementations, normalizing the computed probability comprises (1352) subtracting the median value from the computed probability and then dividing the result by the median, as illustrated in FIG. 9A.

The computed probability (or normalized probability) is then compared to a threshold value θ. When the computed probability is (1354) greater than a predefined threshold value, the process 1300 determines (1354) that the new social media message is not associated with any of the primary venues.

When the computed probability is (1356) less than or equal to the predefined threshold value, the process 1300 determines (1356) that the new social media message is associated with one of the primary venues. In some implementations, just knowing that the social media message is venue linked is all that is needed. However, in many cases, the process 1300 applies (1358) a ranking process to determine a specific first venue of the primary venues as corresponding to the social media message. That is, once there is a high enough confidence that the social media message is associated with some venue, it is useful to figure out what that venue is. In some implementations, the ranking process comprises (1360) computing a probability score for at least a plurality of the primary venues, and identifying (1360) at least one of the primary venues with a highest probability score as corresponding to the social media message. This is illustrated with respect to FIGS. 4 and 8 above. In some implementations, alternative ranking techniques are applied.

Although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for inferring linkage between social media messages and venues, comprising:
   performing, at a computer system having one or more processors and memory storing one or more programs configured for execution by the one or more processors, a set of operations, including:
   accessing a social network graph, stored in a database on the computer system, comprising user nodes representing social media users, message nodes representing social media messages generated by the social media users, and venue nodes, wherein the venue nodes are distinct and separate from the nodes representing social media users and the nodes representing social media messages, wherein the venue nodes include:
      a plurality of nodes representing a plurality of physical venues; and
      a no-venue node that does not represent a physical venue;
   wherein a link in the social network graph between a respective message node and the no-venue node indicates that the social media message does not correspond to a physical venue;
   constructing a plurality of training feature vectors, wherein each training feature vector includes a respective plurality of features that use paths through the social network graph to measure connectedness between a respective social media message and a respective venue;
   using the training feature vectors to train a classifier to estimate probabilities that social media messages are associated with venues;
   receiving a new social media message from a user;
   constructing a feature vector for the new social media message, wherein each feature vector includes a plurality of features that use paths through the social network graph to measure connectedness between the new social media message and the no-venue node;
   executing the trained classifier using the feature vector as input to compute a probability that the new social media message is associated with the no-venue node;
   when the computed probability is greater than a predefined threshold value, determining that the new social media message does not correspond to a physical venue of the plurality of physical venues; and
   when the computed probability is less than or equal to the predefined threshold value, determining that the new social media message corresponds to a respective physical venue of the plurality of physical venues.

2. The method of claim 1, wherein the computed probability is normalized prior to comparing to the predefined threshold value.

3. The method of claim 2, further comprising:
   using the classifier to compute a median probability of a social media message corresponding to a physical venue of the plurality of physical venues;
   wherein normalizing the computed probability uses the median probability.

4. The method of claim 1, wherein each training feature vector includes a label that indicates whether or not the respective social media message is associated with the respective venue; and
   wherein one or more features of each training feature vector comprise measures based on respective types of path through the social network graph.

5. The method of claim 4, wherein a first feature corresponds to paths through the social network graph directly from a user's social media messages to venues.

6. The method of claim 4, wherein a second feature corresponds to paths through the social network graph from a user's social media messages to venues through connections with friends.

7. The method of claim 4, wherein the social network graph includes nodes corresponding to venue categories, and a third feature corresponds to paths through the social network graph that connect pairs of venues sharing a common venue category.

8. The method of claim 4, wherein the social network graph includes nodes corresponding to content words from social media messages, and a fourth feature corresponds to paths through the social network graph that connect pairs of nodes that have one or more shared content words.

9. The method of claim 4, wherein constructing the plurality of training feature vectors includes:
   obtaining path counts for each respective type of path through the social network graph connecting the respective social media message to the respective venue; and
   setting the path counts as the features in the training feature vectors.

10. The method of claim 1, wherein a fifth feature of each training vector measures physical distance between the respective venue and physical coordinates of previously geotagged social media messages generated by the user.

11. The method of claim 1, wherein the classifier is trained using a support vector machine.

12. The method of claim 1, wherein the plurality of physical venues are selected based on at least one of a predefined region, a type of venue, a venue name, a preference by a user, a history of venue inference, and a distance from geo-coordinates associated with a social media message.

13. The method of claim 1, wherein the new social media message is not geotagged.

14. The method of claim 1, further comprising after determining that the new social media message does not correspond to a physical venue of the plurality of physical venues, applying a ranking process to determine a specific first venue of the plurality of physical venues as corresponding to the social media message.

15. The method of claim 14, wherein the ranking process comprises computing a probability score for at least two of the plurality of physical venues, and identifying at least one of the plurality of physical venues with a highest probability score as corresponding to the social media message.

16. A computer system for inferring linkage between social media messages and venues, comprising:
   one or more processors;
   memory; and
   one or more programs stored in the memory configured for execution by the one or more processors, the one or more programs comprising instructions for:
   accessing a social network graph, stored in a database on the computer system, comprising user nodes representing social media users, message nodes representing social media messages generated by the social media users, and venue nodes, wherein the venue nodes are distinct and separate from the nodes representing social media users and the nodes representing social media messages, wherein the venue nodes include:
  a plurality of nodes representing a plurality of physical venues; and
  a no-venue node that does not represent a physical venue;
wherein a link in the social network graph between a respective message node and the no-venue node indicates that the social media message does not correspond to a physical venue;
constructing a plurality of training feature vectors, wherein each training feature vector includes a respective plurality of features that use paths through the social network graph to measure connectedness between a respective social media message and a respective venue;
using the training feature vectors to train a classifier to estimate probabilities that social media messages are associated with venues;
receiving a new social media message from a user;
constructing a feature vector for the new social media message, wherein each feature vector includes a plurality of features that use paths through the social network graph to measure connectedness between the new social media message and the no-venue node;
executing the trained classifier using the feature vector as input to compute a probability that the new social media message is associated with the no-venue node;
when the computed probability is greater than a predefined threshold value, determining that the new social media message does not correspond to a physical venue of the plurality of physical venues; and
when the computed probability is less than or equal to the predefined threshold value, determining that the new social media message corresponds to a respective physical venue of the plurality of physical venues.

17. The computer system of claim 16, wherein the computed probability is normalized prior to comparing to the predefined threshold value.

18. The computer system of claim 17, wherein the one or more programs further comprise instructions for:
  using the classifier to compute a median probability of a social media message corresponding to a physical venue of the plurality of physical venues;
  wherein normalizing the computed probability uses the median probability.

19. The computer system of claim 16, wherein each training feature vector includes a label that indicates whether or not the respective social media message is associated with the respective venue; and
wherein one or more features of each training feature vector comprise measures based on respective types of path through the social network graph.

20. A non-transitory computer readable storage medium storing one or more programs configured for execution by a computer system having one or more processors and memory, the one or more programs comprising instructions for:
  accessing a social network graph, stored in a database on the computer system, comprising user nodes representing social media users, message nodes representing social media messages generated by the social media users, and venue nodes, wherein the venue nodes are distinct and separate from the nodes representing social media users and the nodes representing social media messages, wherein the venue nodes include:
    a plurality of nodes representing a plurality of physical venues; and
    a no-venue node that does not represent a physical venue;
  wherein a link in the social network graph between a respective message node and the no-venue node indicates that the social media message does not correspond to a physical venue;
  constructing a plurality of training feature vectors, wherein each training feature vector includes a respective plurality of features that use paths through the social network graph to measure connectedness between a respective social media message and a respective venue;
  using the training feature vectors to train a classifier to estimate probabilities that social media messages are associated with venues;
  receiving a new social media message from a user;
  constructing a feature vector for the new social media message, wherein each feature vector includes a plurality of features that use paths through the social network graph to measure connectedness between the new social media message and the no-venue node;
  executing the trained classifier using the feature vector as input to compute a probability that the new social media message is associated with the no-venue node;
  when the computed probability is greater than a predefined threshold value, determining that the new social media message does not correspond to a physical venue of the plurality of physical venues; and
  when the computed probability is less than or equal to the predefined threshold value, determining that the new social media message corresponds to a respective physical venue of the plurality of physical venues.

* * * * *